United States Patent
Inano et al.

(10) Patent No.: US 7,994,899 B2
(45) Date of Patent: *Aug. 9, 2011

(54) INFORMATION ACCESS SYSTEM AND METHOD FOR ACCESSING INFORMATION IN CONTACTLESS INFORMATION STORAGE DEVICE

(75) Inventors: Satoshi Inano, Kawasaki (JP); Isamu Yamada, Kawasaki (JP); Shinichi Shiotsu, Kawasaki (JP); Akira Itasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 658 days.

This patent is subject to a terminal disclaimer.

(21) Appl. No.: 11/589,216

(22) Filed: Oct. 30, 2006

(65) Prior Publication Data

US 2008/0005259 A1    Jan. 3, 2008

(30) Foreign Application Priority Data

Jun. 30, 2006    (JP) ................................ 2006-182230

(51) Int. Cl.
    *H04Q 5/22*    (2006.01)
(52) U.S. Cl. ........................ 340/10.3; 340/10.2; 709/212
(58) Field of Classification Search .................. 709/212; 340/10.3, 10.2
    See application file for complete search history.

(56) References Cited

U.S. PATENT DOCUMENTS

| | | | |
|---|---|---|---|
| 5,978,655 A | 11/1999 | Ohura et al. | |
| 6,169,388 B1 * | 1/2001 | Niemitalo et al. | 320/139 |
| 6,282,407 B1 * | 8/2001 | Vega et al. | 455/41.1 |
| 6,812,824 B1 | 11/2004 | Goldinger et al. | |
| 6,836,472 B2 | 12/2004 | O'Toole et al. | |
| 6,922,402 B1 | 7/2005 | Ko | |
| 2001/0040507 A1 | 11/2001 | Eckstein et al. | |
| 2004/0085191 A1 * | 5/2004 | Horwitz et al. | 340/10.3 |
| 2004/0257204 A1 * | 12/2004 | Liao et al. | 340/10.2 |
| 2005/0156711 A1 * | 7/2005 | Aljadeff et al. | 340/10.34 |
| 2005/0156742 A1 | 7/2005 | Fujii | |
| 2006/0022800 A1 | 2/2006 | Krishna et al. | |
| 2006/0038658 A1 | 2/2006 | Jarvis et al. | |
| 2006/0114109 A1 * | 6/2006 | Geissler | 340/539.13 |

(Continued)

FOREIGN PATENT DOCUMENTS

EP    1120922    8/2001

(Continued)

OTHER PUBLICATIONS

Rivest et al., The blocker tag: selective blocking of RFID tags for consumer privacy. In Proceedings of the 10th ACM Conference on Computer and Communications Security (Washington D.C., USA, Oct. 27-30, 2003). CCS '03. ACM, New York, NY, 103-111.*

(Continued)

*Primary Examiner* — Wing F Chan
*Assistant Examiner* — Kostas Katsikis
(74) *Attorney, Agent, or Firm* — Staas & Halsey LLP

(57) ABSTRACT

In an information access system, a first reader/writer device cyclically transmits an information request signal at a first frequency in a first period and goes into an inactive state in a second period, and a second reader/writer device cyclically transmits an information request signal at the first frequency in the second period and goes into an inactive state in the first period. An active contactless information storage device senses a carrier of an RF signal at the first frequency in predetermined periods occurring in a predetermined cycle shorter than each of the first and second periods.

20 Claims, 21 Drawing Sheets

U.S. PATENT DOCUMENTS

2007/0032250 A1 * 2/2007 Feher .................. 455/456.2

FOREIGN PATENT DOCUMENTS

| JP | 6-290323 | 10/1994 |
| JP | 98/16849 | 4/1998 |
| JP | 2000-20651 | 1/2000 |
| JP | 2000-113130 | 4/2000 |
| JP | 2000-187711 | 7/2000 |
| JP | 2001-251210 | 9/2001 |
| JP | 2004-266550 | 9/2004 |
| WO | 97/43740 | 11/1997 |
| WO | WO 97/43740 | 11/1997 |
| WO | WO 9940704 A1 * | 8/1999 |

OTHER PUBLICATIONS

Tedjini et al., Antennas for RFID tags. In Proceedings of the 2005 Joint Conference on Smart Objects and Ambient intelligence: innovative Context-Aware Services: Usages and Technologies (Grenoble, France, Oct. 12-14, 2005). sOc-EUSAI '05, vol. 121. ACM, New York, NY, 19-22.*

Notice of Allowance mailed Jan. 21, 2009 in U.S. Patent No. 7,536,152, issued May 19, 2009.

* cited by examiner

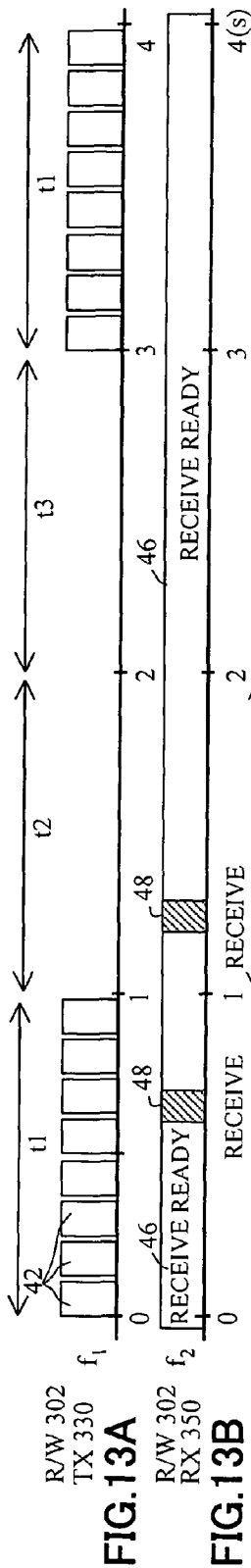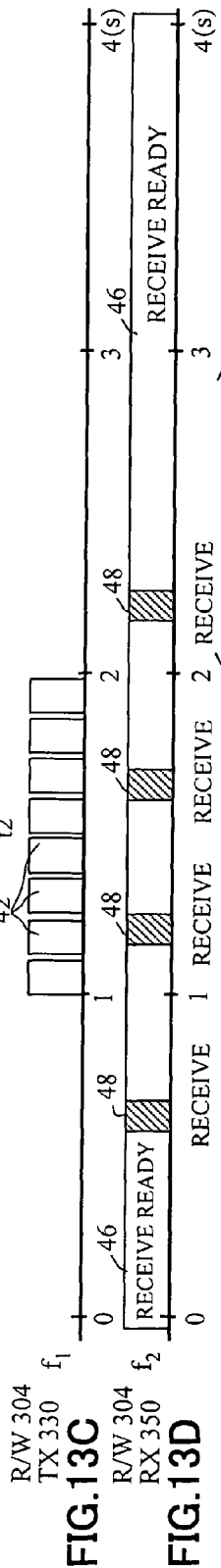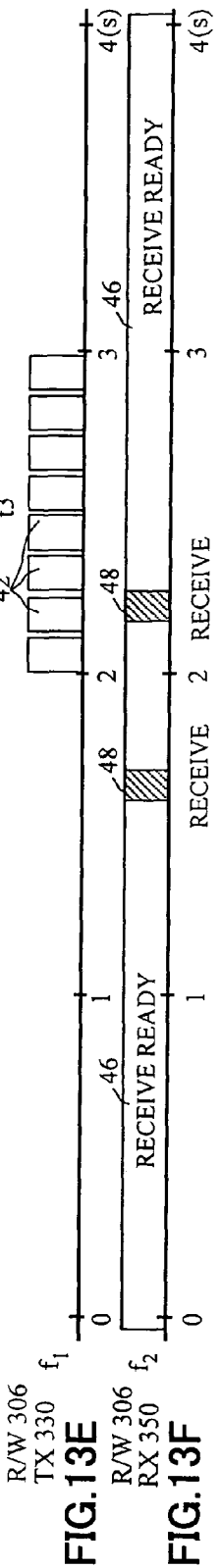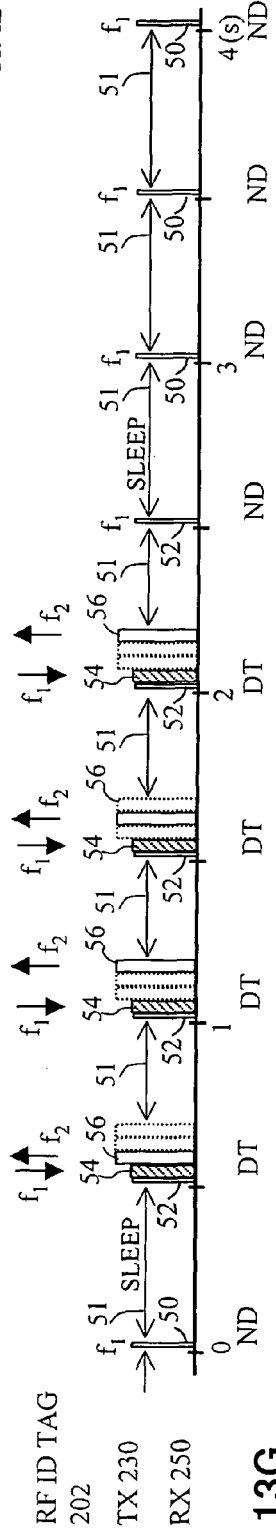

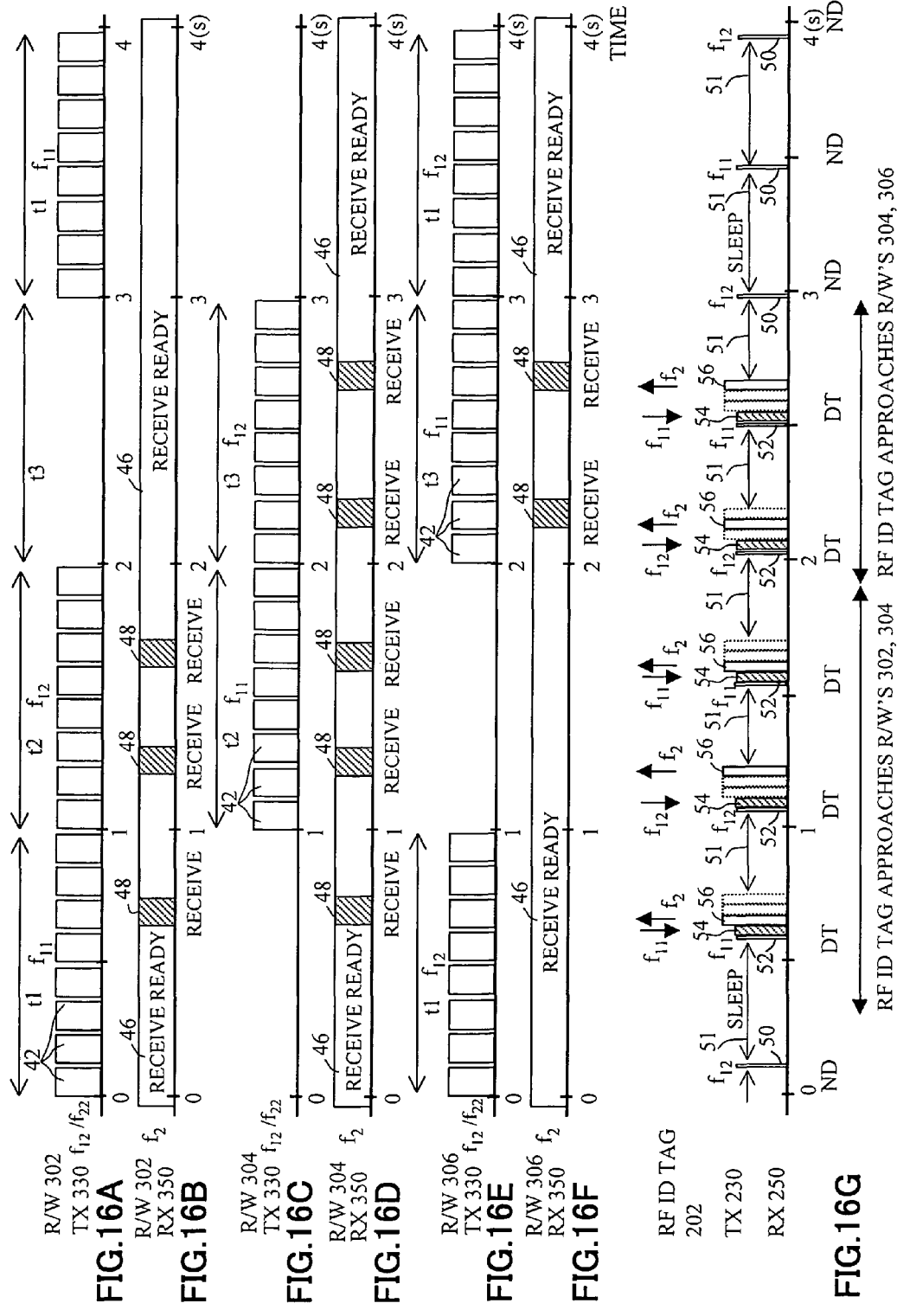

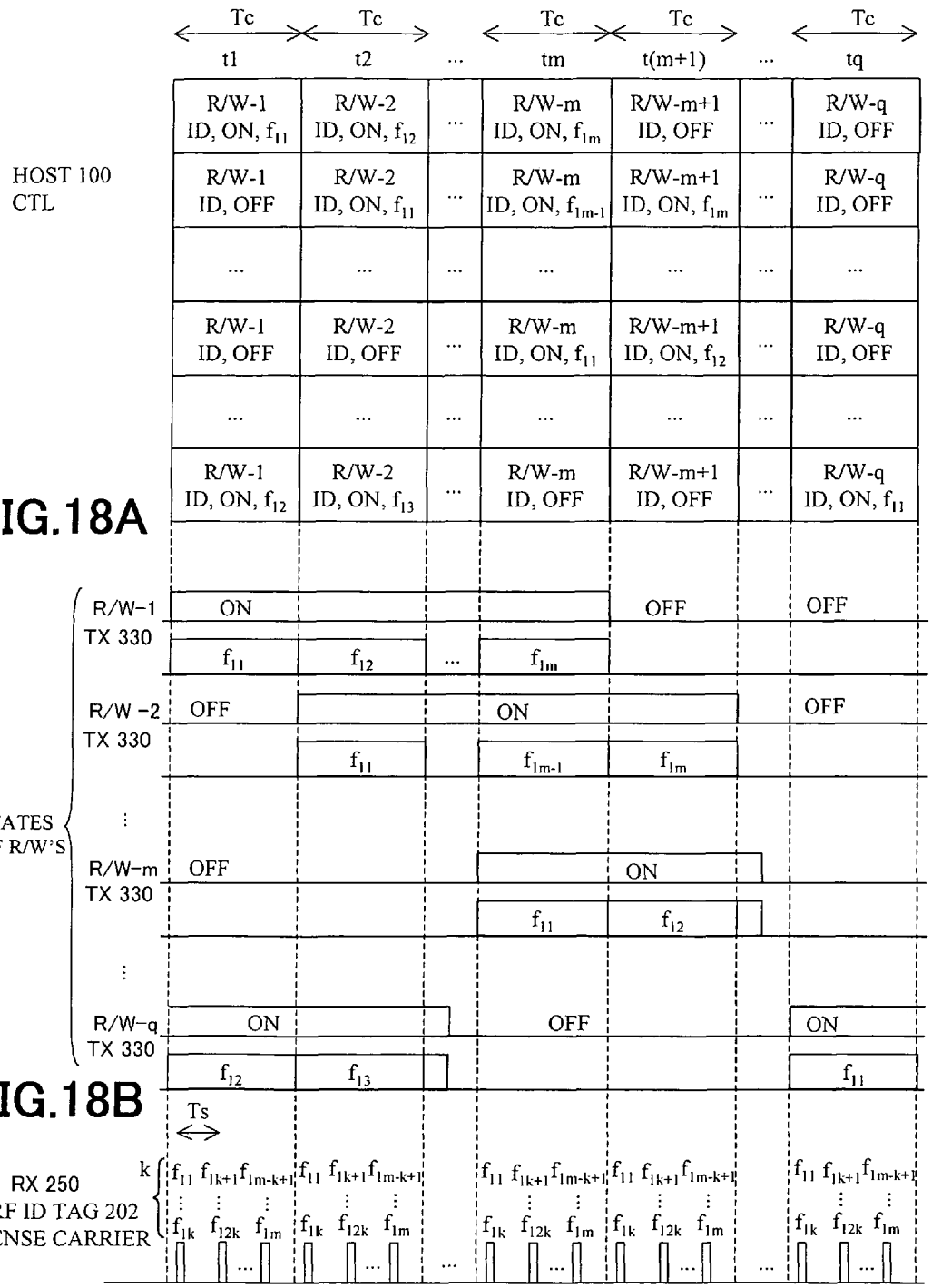
FIG.18A
FIG.18B
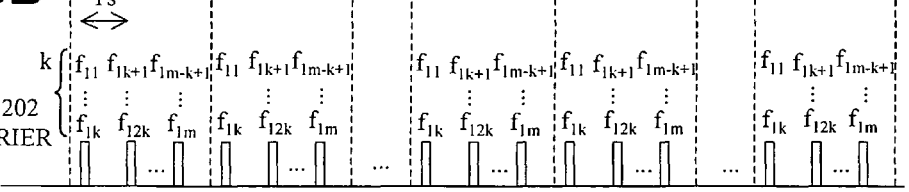
FIG.18C

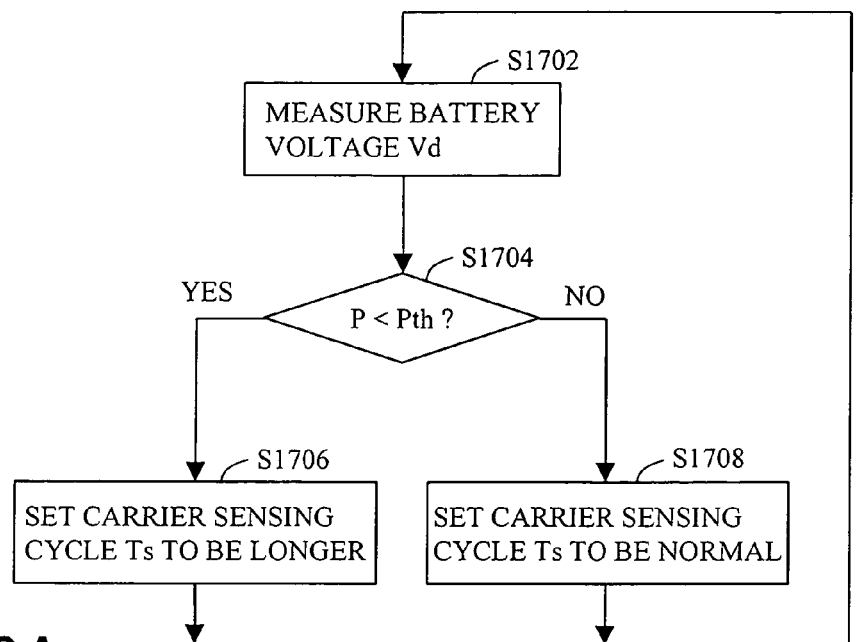
FIG.19A
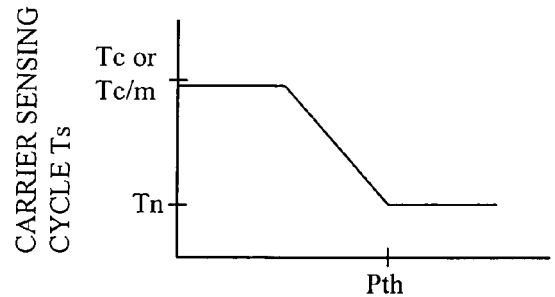
FIG.19B
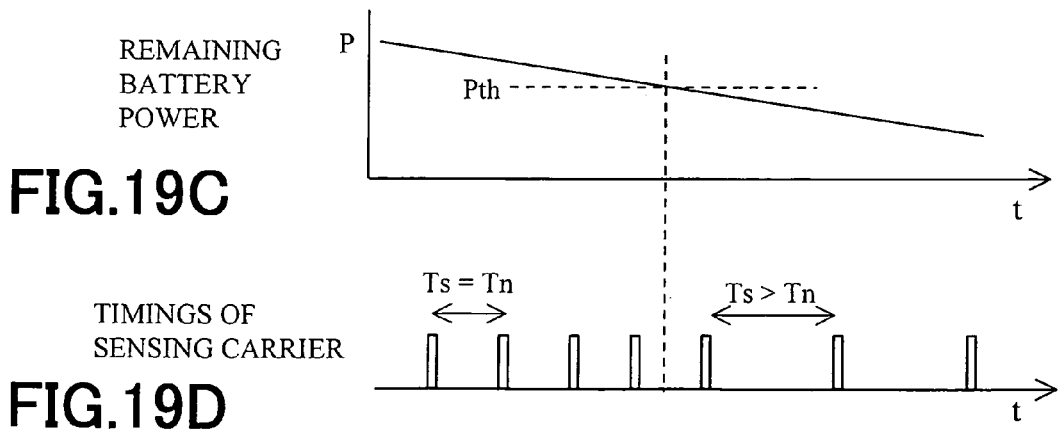
FIG.19C
FIG.19D

INFORMATION ACCESS SYSTEM AND METHOD FOR ACCESSING INFORMATION IN CONTACTLESS INFORMATION STORAGE DEVICE

FIELD OF THE INVENTION

The present invention relates generally to an active-type contactless information storage device which a reader/writer device can read and write information from and into in a contactless manner, and in particular to a system for reading an active-type RF ID tag or a contactless IC card with low power consumption.

BACKGROUND OF THE INVENTION

An RF ID tag with a battery power supply or of an active type, which is attached to a merchandise article or the like, or carried by a person, transmits an RF signal at a predetermined frequency that carries an ID and other information related to the article or the person, so that the RF signal is received and the information is read out by a reader device. The read-out information is further processed by a computer or the like, so that the distribution of the article or the action of the person is monitored and managed. The active-type RF ID tag with battery power supply has a larger communication range than a passive-type RF ID tag that receives power from a reader/writer device in a contactless manner, and hence is practical in use. However, the active-type RF ID tag transmits an RF signal in a fixed cycle, has a risk of being tracked by a third party, and hence has a problem in the security. To address this security problem, there has been developed an improved active-type RF ID tag that responds only to a tag ID request transmitted by the reader/writer device.

PCT International Publication WO 97/43740 published on Nov. 20, 1997 describes radio frequencies identification device which includes an integrated circuit including a receiver, a transmitter and a microprocessor. The receiver and transmitter together form an active transponder. The integrated circuit is preferably a monolithic single die integrated circuit including the receiver, the transmitter and the microprocessor. Because the device includes an active transponder, instead of a transponder which relies on magnetic coupling for power, the device has a much larger range.

Japanese Patent Application Publication JP 2000-113130-A published on Apr. 21, 2000 describes an IC tag detection system with low power consumption. This system includes a plurality of IC tags provided with different set times of day. Each IC tag includes a communication circuit, a control unit, a power source unit for supplying power from a battery to them, and time measuring means. Each IC tag performs transmission at each prescribed set time of day. This system also includes a detector for detecting the presence or absence of the IC tags based on the communication with them. The detector has a communication circuit, and determines the presence or absence of reception from them successively at the respective set times of day of the respective IC tags. Since the IC tag receives no inquiry from the detector, the IC tag can avoid useless reaction and battery consumption.

Japanese Patent Application Publication JP 2001-251210-A published on Sep. 14, 2001 describes a method of locking a frequency in a transmitter at each of two nodes in a full duplex link, without using a separate reference oscillator in each node. The method provides locking of transmission frequencies of both nodes in a full duplex link at the same time by utilizing information of a received frequency to tune carrier frequencies of the transmitters. The offset of the carrier frequency of the first transmitter is detected as the offset of a second corresponding receiver. The second receiver shifts the carrier frequency of the second transmitter, in response to the detected offset, to inform the first transmitter about the detected offset. The first receiver uses the detected offset to correct the carrier frequency of the first transmitter.

Japanese Patent Application Publication JP HEI 06-290323-A published on Oct. 18, 1994 describes a fare collecting device for toll highway. In the fare collecting device, fare center transmitters for respective lanes are monitored and controlled by a computer to prevent radio waves from radiating simultaneously from a plurality of fare center antennas, to thereby prevent interference of radio waves among the antennas for the lanes.

Japanese Patent Application Publication JP 2004-266550-A published on Sep. 24, 2004 describes an RF tag interrogator system. In the interrogator system, a first interrogator performs transmission at time intervals of $3*t_0$ resulting from multiplying a prime 3 by a predetermined time $t_0$, and stops the transmission after the transmission for a predetermined period of time. A second interrogator performs transmission at time intervals of $7*t_0$ resulting from multiplying a prime 7 by a predetermined time $t_0$, and stops the transmission after the transmission for the predetermined period of time. A third interrogator performs transmission at time intervals of $5*t_0$ resulting from multiplying a prime 5 by the predetermined time $t_0$, and stops the transmission after the transmission for a predetermined period of time. This prevents interference of RF signals from the interrogators as much as possible, and prevents the interference with a certain interrogator communicating with an RF tag for a long period of time.

SUMMARY OF THE INVENTION

In accordance with an aspect of the present invention, an information access system for accessing information stored in a contactless information storage device, comprises: an active contactless information storage device having a memory, a first control unit, a first receiver unit for sensing a carrier of an RF signal at a first frequency for detection, and a first transmitter unit for transmitting a response signal at a second frequency different from the first frequency in response to reception of an information request signal; a first reader/writer device connected to an information processing apparatus, and having a second control unit, a second transmitter unit for cyclically transmitting an information request signal at the first frequency in a first period and going into an inactive state in a second period, under the control of the second control unit, and a second receiver unit adapted to be continuously ready to receive an RF signal at the second frequency; and a second reader/writer device connected to the information processing apparatus, and having a third control unit, a third transmitter unit for cyclically transmitting an information request signal at the first frequency in the second period and going into an inactive state in the first period, under the control of the third control unit, and a third receiver unit adapted to be continuously ready to receive an RF signal at the second frequency. The first control unit controls the first receiver unit to sense a carrier of an RF signal at the first frequency in predetermined periods occurring in a predetermined cycle shorter than each of the first and second periods, causes the first receiver unit to further receive the information request signal when the first receiver unit senses and detects a carrier of an RF signal at the first frequency in a particular predetermined period, and causes the first transmitter unit to transmit a response signal at the second frequency that carries a piece of information stored in the memory in response to the information request signal. The first control unit causes, in the carrier sensing, the first receiver unit to be in an active state and the transmitter unit to be in an inactive state in the particular predetermined period, and when the first receiver unit attempts to sense a carrier of an RF signal at the first frequency in the particular predetermined period but detects no carrier, controls the first receiver unit and the first transmitter unit to maintain the inactive state during a non-carrier sensing period between the particular predetermined period for carrier sensing and the predetermined period for subsequent carrier sensing.

In accordance with another aspect of the invention, an information access system for accessing information stored in a contactless information storage device, comprises: an active contactless information storage device having a memory, a first control unit, a first receiver unit for sensing carriers of RF signals at a plurality, m, of different frequencies for detection in respective predetermined periods, where m is an integer, and a first transmitter unit for transmitting a response signal at another frequency different from the m frequencies in response to reception of an information request signal; and a plurality, q, of reader/writer devices, where q is an integer larger than m and is equal to or larger than three. Each of the q reader/writer devices has a second transmitter unit for cyclically transmitting an information request signal at corresponding one of the m frequencies in each of m periods among cyclic q periods and going into an inactive state in the other periods among the cyclic q periods, and a second receiver unit adapted to be continuously ready to receive an RF signal at the third frequency. In ones of the cyclic q periods, m reader/writer devices among the q reader/writer devices cyclically transmit respective information request signals at respective different frequencies. During one of the cyclic q periods, the first control unit controls the first receiver unit to sense sequentially carriers of RF signals at the m frequencies in particular predetermined periods occurring in a cycle shorter than the length of the one period divided by m. When the first receiver unit senses and detects a carrier of an RF signal at one of the m frequencies in a particular predetermined period, the first control unit causes the first receiver unit to further receive the information request signal, and causes, in response to the information request signal, the first transmitter unit to transmit a response signal at the other frequency carrying a piece of information stored in the memory. In the carrier sensing, the first control unit causes the first receiver unit to be in an active state and the transmitter unit to be in an inactive state in the particular predetermined period and a subsequent predetermined period. When the first receiver unit attempts to sense a carrier of an RF signal at one of the m frequencies in the particular predetermined period but detects no carrier, the first control unit controls the first receiver unit and the first transmitter unit to maintain the inactive state during a non-carrier sensing period between the particular predetermined period for carrier sensing and the subsequent predetermined period for subsequent carrier sensing.

The invention also relates to an active contactless information storage device for use in the information access system described above, and a method for accessing information in a contactless information storage device in the information access system described above.

BRIEF DESCRIPTION OF THE DRAWINGS

FIGS. 13A, 13C and 13E show a time chart of processing for transmission of RF signals at one frequency carrying ID request commands (CMDs) in the reader/writer devices of FIG. 11, and FIGS. 13B, 13D and 13F show a time chart of receive ready state and of the processing for reception of received RF signals at one frequency in the respective reader/writer devices of FIG. 11, and FIG. 13G shows a time chart of carrier sensing, reception processing of received RF signals, and transmission processing for an RF signal carrying a response, in the active RF ID tag which is passing near the reader/writer devices of FIG. 11;

FIGS. 16A, 16C and 16E show a time chart of processing for transmission of RF signals at two different frequencies carrying ID request commands (CMD) in the reader/writer devices of FIG. 14, and FIGS. 16B, 16D and 16F show a time chart of receive ready state and of the processing for reception of received RF signals at one frequency in the respective reader/writer devices of FIG. 14, and FIG. 16G shows a time chart of carrier sensing, reception processing of received RF signals, and transmission processing for an RF signal carrying a response occurring subsequent to the successful authentication, in the RF ID tag which is passing near the reader/writer devices of FIG. 14;

FIG. 18A shows a further time chart of a control signal provided from the host apparatus to a plurality of reader/writer devices, FIG. 18B shows a time chart of the operation state of the transmitter unit of each of the reader/writer devices, and FIG. 18C shows a time chart of sensing carriers in the active RF ID tag; and FIG. 19A is a flow chart for changing the cycle of carrier sensing in the receiver unit depending on the remaining electric power of a battery, which is executed by the control unit of the active RF ID tag, FIG. 19B shows the cycle of carrier sensing of the receiver unit relative to the remaining electric power of the battery of the active RF ID tag, and FIGS. 19C and 19D show a relation between the remaining electric power of the battery and the cycle of carrier sensing in the active RF ID tag.

DESCRIPTION OF THE PREFERRED EMBODIMENTS

The known improved active-type RF ID tag that responds only to a tag ID request carried by an RF signal transmitted by a reader/writer device requires a receiving circuit, and hence has a larger circuit size and a significantly higher power consumption than a transmission-dedicated active-type RF ID tag.

The inventors have recognized that a reader/writer device, which is adapted to cyclically transmit an RF signal to an RF ID tag at a particular frequency and at sufficiently short intervals and to be continuously ready to receive an RF signal from the RF ID tag at a different frequency, will significantly reduce the power consumption of the RF ID tag, so that the battery run time of the RF ID tag can be extended. The inventors have also recognized that a plurality of reader/writer devices may be adapted to advantageously transmit respective tag ID requests in respective different periods of time for transmission in order to prevent interference between tag ID requests carried by RF signals transmitted by the plurality of reader/writer devices.

An object of the present invention is to reduce possible interference among a plurality of reader/writer devices.

Another object of the invention is to allow an active contactless information storage device to reliably sense carriers of RF signals transmitted from a plurality of reader/writer devices.

According to the invention, possible interference between reader/writer devices can be reduced, and an active contactless information storage device can reliably sense a carrier of an RF signal transmitted from a reader/writer device.

Figure 1:
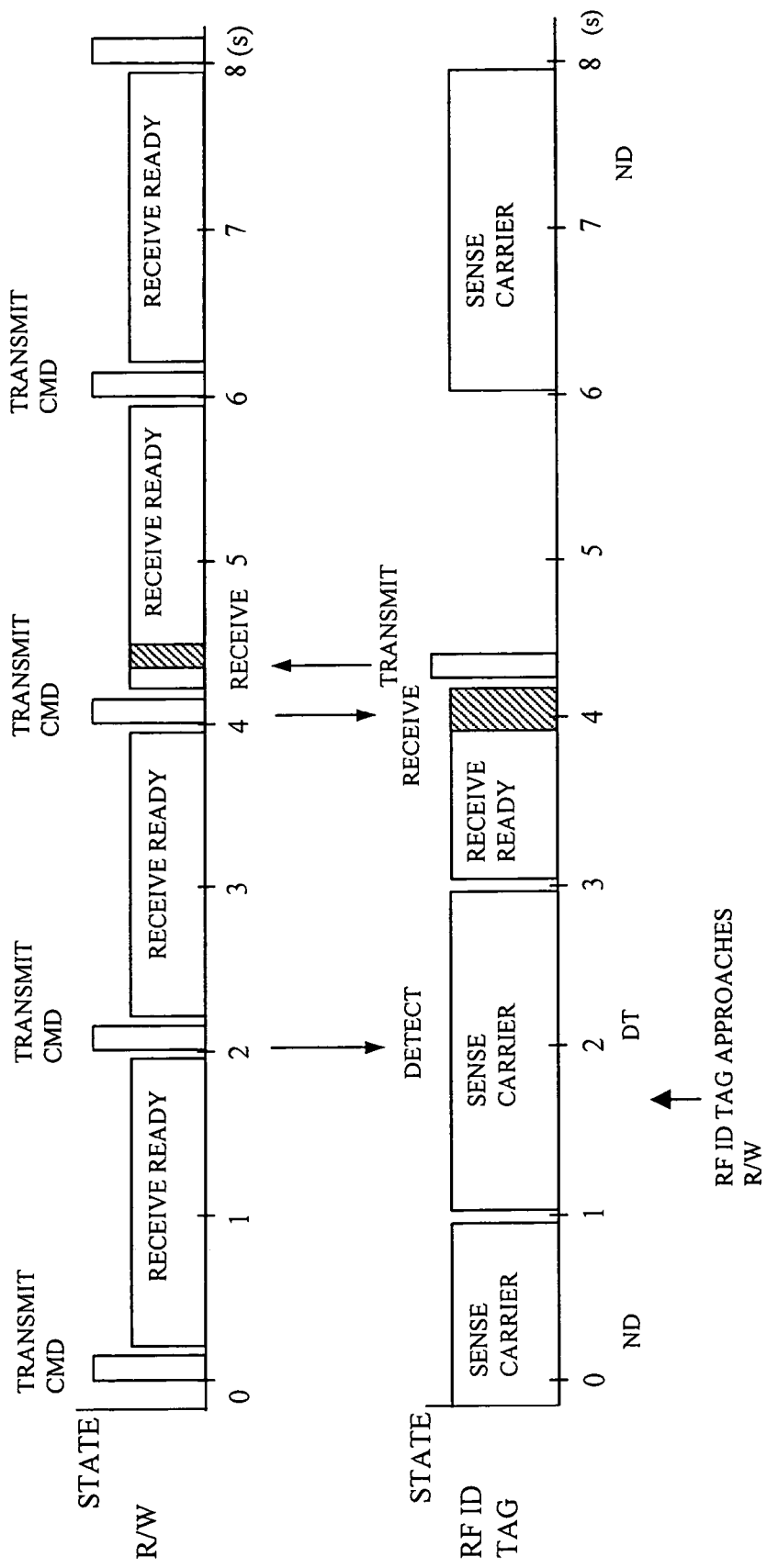
FIG. 1 is a time chart of a conventional improved active-type RF ID tag and of a reader/writer device (R/W) for reading the RF ID tag.

FIG. 1 is a time chart of a conventional improved active-type RF ID tag and of a reader/writer device (R/W) for reading the RF ID tag. The reader/writer device transmits a command (CMD) and receives a response from the RF ID on the same frequency channel in a time division manner. The reader/writer device transmits a command of requesting an ID in a fixed cycle for example, of two (2) seconds and in the duration, for example, of 100 ms. In the remaining time, the reader/writer device is in a state of receive ready.

In order for such a single reader/writer device to accommodate a plurality of RF ID tags, each RF ID tag is typically adapted to transmit a response signal to the reader/writer device at a random timing in response to the receipt of a single ID request transmitted by the reader/writer device, so as to avoid possible collision with another response signal. Each RF ID tag transmits a response signal to the reader/writer device in a time slot selected at random within a predetermined period of time subsequent to the receipt of the command, so that the probability of collision between the response signals is reduced. However, the reader/writer device is required to extend the duration of the state of receive ready. For example, if the duration for response transmission at a random timing from the RF ID tag is between zero (0) and 1.5 seconds or the like, the reader/writer device requires a duration of the receive ready state for 1.5 seconds or longer. This increases the cycle length of command transmission in the reader/writer device. On the other hand, in order to detect a request command transmitted by the reader/writer device, the RF ID tag senses, in a fixed cycle, a carrier, i.e., detects the intensity of a received RF signal. The RF ID tag is adapted to operate for reception and then operate for transmission, only when a carrier is detected. If the cycle length of transmission in the reader/writer device is two (2) seconds as an example, the carrier sensing duration also requires to have about two or more seconds in order to ensure the detection.

In general, when the RF ID tag receives no request from the reader/writer device, the RF ID tag is required to enter into a power down mode of operation in a duration intervening between adjacent carrier sensing durations so that the power consumption is reduced as much as possible and that the battery run time is extended. However, if about two seconds is reserved for the carrier sensing duration, little time remains for the power down duration, and hence it is difficult to significantly reduce the power consumption.

Thus, the active-type RF ID tag of FIG. 1 which is required to respond to a request command transmitted in a long cycle requires a long carrier sensing duration. This increases the power consumption, and hence reduces the battery run time.

The invention will be described in connection with non-limiting embodiments with reference to the accompanying drawings. Throughout the drawings, similar symbols and numerals indicate similar items and functions.

Figure 2:
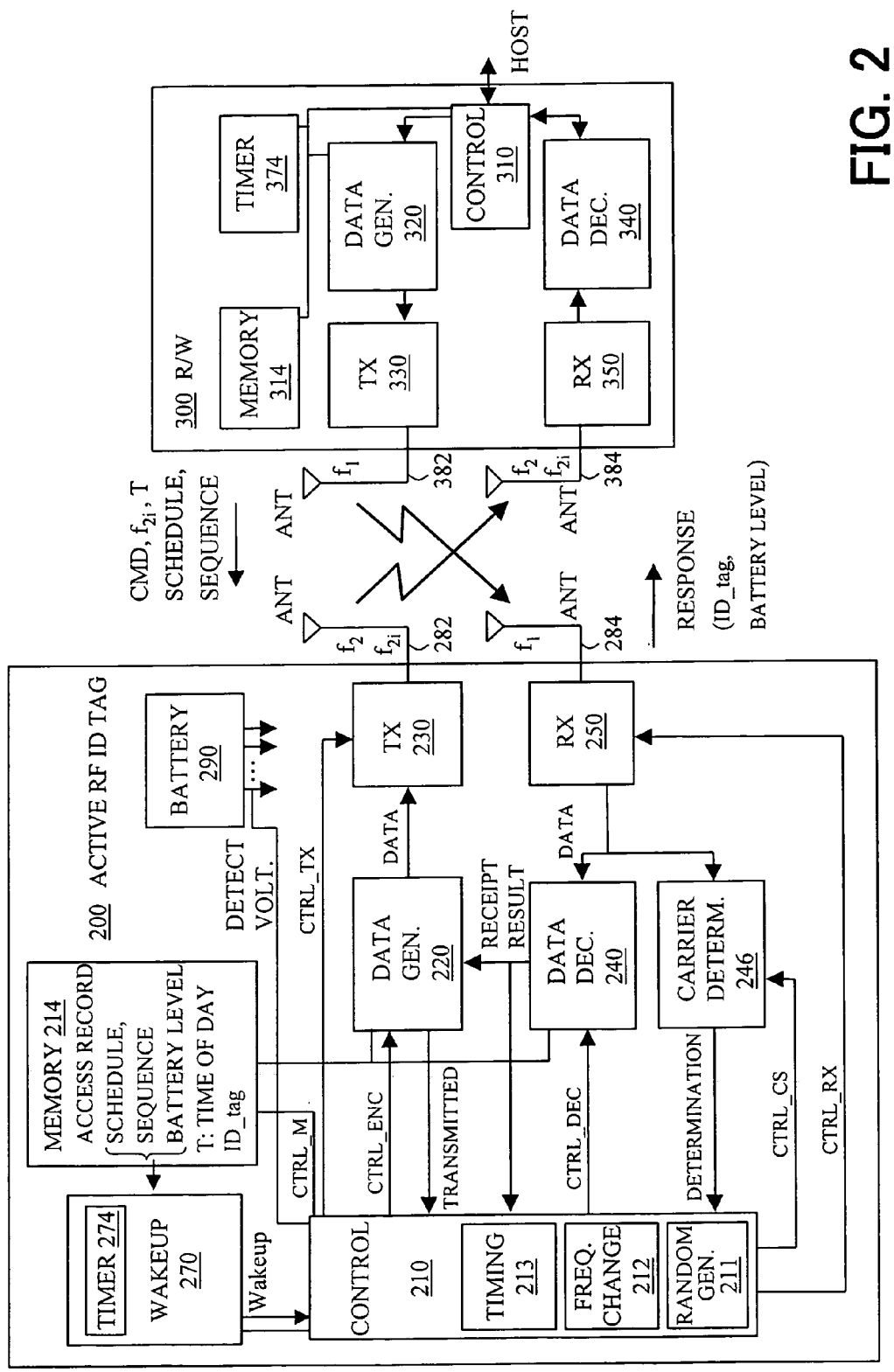
FIG. 2 shows the configurations of a further improved active-type RF ID tag as an active contactless information storage device and of a reader/writer device.

FIG. 2 shows the configurations of a further improved active-type RF ID tag 200 as an active contactless information storage device and of a reader/writer device 300. As an active contactless information storage device, a contactless IC card having a configuration similar to that of the active-type RF ID tag 200 may be used in place of the active-type RF ID tag 200.

The active-type RF ID tag 200 includes: a control unit 210; a memory 214; a data generation unit 220 for encoding data such as a tag ID (ID_tag) stored in the memory 214 in accordance with a predetermined encoding scheme to thereby generate encoded data; a transmitter unit (TX) 230 for modulating a carrier with the encoded data of a baseband received from the data generation unit 220, and then transmitting an RF signal at a frequency $f_2$ or RF signals at different frequencies $f_{2i}$ (i=1, 2, ..., n); a receiver unit (RX) 250 for receiving and demodulating an RF signal at a frequency $f_1$, to thereby reproduce baseband encoded data, and then generating data indicative of the carrier intensity of the received RF signal; a data decoding unit 240 for decoding the encoded data received from the receiver unit 250 in accordance with the predetermined encoding scheme, to thereby generate decoded data; a carrier determination unit 246 for determining the presence or absence of a received RF signal carrier in accordance with the data indicative of the carrier intensity; a wakeup unit 270 for generating a wakeup signal in accordance with a time control sequence having been set up beforehand; a transmission antenna (ANT) 282 coupled to the transmitter unit 230; a receiving antenna (ANT) 284 coupled to the receiver unit 250; and a battery 290 for supplying power to these elements 210-270. The frequencies $f_1$ and $f_2$ may be 300 MHz and 301 MHz, respectively, for example. The frequencies $f_{2i}$ are 301 MHz, 302 MHz, . . . , 305 MHz, for example. The transmission output power of the transmitter unit (TX) 230 may be 1 mW for example. Alternatively, the antennas 282 and 284 may be composed of a single antenna.

The control unit 210 includes a random number generator 211 for generating a random number for selecting a time slot for transmission, a frequency changing unit 212 for changing the transmitting frequency $f_{2i}$, and a timing unit 213 for adjusting a timing for transmission.

The control unit 210 is always in an active state after power activation, and provides a memory control signal CTRL_M, a data generation control signal CTRL_ENC, a transmission control signal CTRL_TX, a reception control signal CTRL_RX, a data decode control signal CTRL_DEC, a carrier determination control signal CTRL_CS and a wakeup unit control signal to the memory 214, the data generation unit 220, the transmitter unit 230, the receiver unit 250, the data decoding unit 240, the carrier determination unit 246, and the wakeup unit 270, respectively. The control unit 210 may be a microprocessor or microcomputer that operates in accordance with a program.

The memory 214 stores information such as, the tag ID (ID_tag) of the RF ID tag 200, the current time-of-day information T, records of accesses performed by the reader/writer device 300, a control schedule and a time control sequence of the wakeup unit 270, the current remaining power level of the battery 290, a cycle of sensing a carrier, a time period of processing for reception, a cycle of transmission, and a time period of transmission. These pieces of information are stored and updated under the control of the control unit 210. The control unit 210 regularly or periodically detects the value of the supply voltage of the battery 290 to thereby determine the current remaining battery power level, and then stores information indicative of the remaining power level of the battery 290 into the memory 214.

The wakeup unit 270 includes a timer 274 for measuring time and thereby generating a time of day, and is always in an active state after the power activation of the RF ID tag 200. In accordance with the time of day of the timer 274 and with the control schedule and the time control sequence read out from the memory 214 and set up beforehand, the wakeup unit 270 provides a wakeup signal to the control unit 210 in a predetermined cycle for sensing a carrier, for example, of two seconds. When a control schedule and a time control sequence, the current time-of-day information T, and an instruction for correcting or updating the control schedule and the time control sequence are received as the received data from the reader/writer device 300, the control unit 210 corrects and updates the current time of day T, the control schedule and the time control sequence in the memory 214. The control unit 210 corrects the time of day of the timer 274 in accordance with the current time of day information T in the memory 214, and then writes and updates the current time of day T generated by the timer 274 in the memory 214.

The data generation unit 220 generates data in a predetermined format containing the tag ID (ID_tag) stored in the memory 214 and the like, then encodes the data in accordance with the predetermined encoding scheme, and then provides the data to the transmitter unit 230. The data may include the remaining battery power level and the access record. The data decoding unit 240 decodes the received encoded data in accordance with the predetermined encoding scheme, and then provides the decoded data to the data generation unit 220 and to the control unit 210. The carrier determination unit 246 receives, from the receiver unit 250, data indicative of the power intensity of the received RF signal carrier, thereby determines the presence or absence of a received carrier to provide the resultant determination to the control unit 210.

The reader/writer device 300 includes: a control unit 310 for transmitting and receiving data to and from a host computer (not shown); a memory 314; a data generation unit 320 for generating data in a predetermined format containing a command (CMD) and the like received from the control unit 310, then encoding the data in accordance with the predetermined encoding scheme, and thereby generating encoded data; a transmitter unit (TX) 330 for modulating the carrier with the baseband encoded data received from the data generation unit 320, and then transmitting an RF signal at a frequency $f_1$; a receiver unit (RX) 350 for receiving an RF signal at a frequency $f_2$ or RF signals at frequencies $f_{21}$-$f_{2n}$; a data decoding unit 340 for decoding the data received from the receiver unit 350 in accordance with the predetermined encoding scheme, thereby generating baseband encoded data, and then providing the decoded data to the control unit 310; a timer 374 for measuring time and thereby generating a time of day; a transmission antenna (ANT) 382 coupled to the transmitter unit 330; and a receiving antenna (ANT) 384 coupled to the receiver unit 350. The transmission output power of the transmitter unit (TX) 330 is 100 mW for example. Alternatively, the antennas 382 and 384 may be composed of a single antenna.

When the control unit 310 receives a command such as a tag ID or information request command (referred to simply as a tag ID request command hereinafter) from the host computer, it provides data containing the command to the data generation unit 320. The data may contain: the transmission frequency $f_2$ or $f_{2i}$ to be used in the RF ID tag 200; the reference current time-of-day information T; and a control schedule and a time control sequence which are new or updated. The command may contain an instruction of correcting or updating the time of the timer 274, in addition to the current time-of-day information T. Further, the command may contain an instruction of correcting or updating the schedule or the sequence stored in the memory 214, in addition to the control schedule or the time control sequence which are new or updated.

Figure 3:
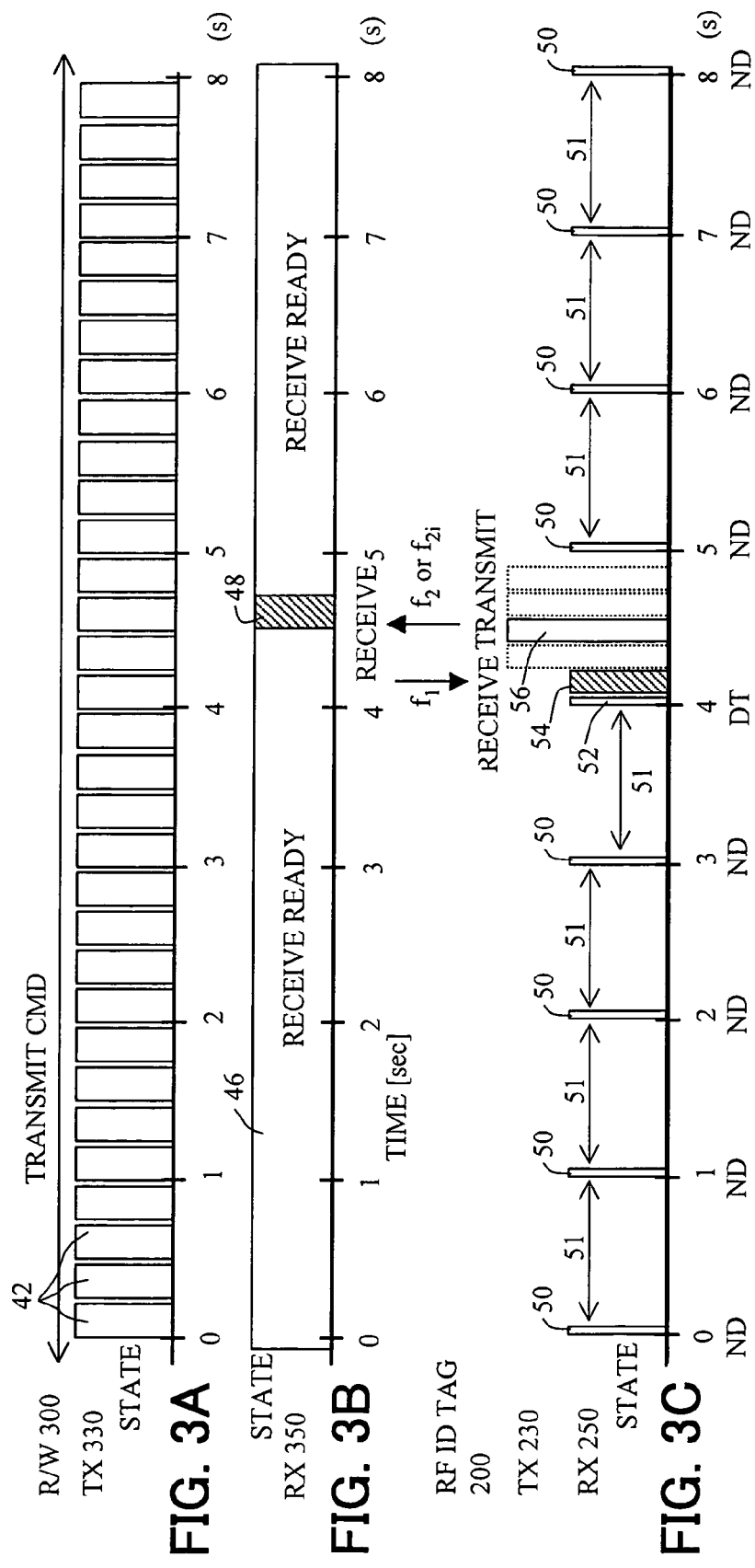
FIG. 3A shows a time chart of processing for transmission of an RF signal carrying a command transmitted from the reader/writer device.
FIG. 3B shows a time chart of a receive ready state and of processing for reception of a received RF signal in the reader/writer device.
FIG. 3C shows a time chart of carrier sensing, processing for reception of a received RF signal, and processing for transmission of an RF signal carrying a response, in the active-type RF ID tag.

FIG. 3A shows a time chart of processing for transmission 42 of an RF signal carrying a command transmitted from the reader/writer device 300. FIG. 3B shows a time chart of a receive ready state 46 and of processing for reception 48 of a received RF signal in the reader/writer device 300. FIG. 3C shows a time chart of carrier sensing 50 and 52, processing for reception 54 of a received RF signal, and processing for transmission 56 of an RF signal carrying a response, in the active-type RF ID tag 200.

Referring to FIG. 3A, the data generation unit 320 of the reader/writer device 300 generates data containing a tag ID request command for the RF ID tag received from the control unit 310, then encodes the data in accordance with the predetermined encoding scheme, and thereby generates encoded data. The transmitter unit 330 continually transmits the RF signal carrying the command in the successive time slots at short intervals in the processing for transmission 42.

Referring to FIG. 3C, in the active-type RF ID tag 200, in response to a wakeup signal from the wakeup unit 274, the control unit 210 enables the receiver unit 250 and the carrier determination unit 246 in the periods for carrier sensing 50 and 52 with a predetermined duration, for example of approximately 1-10 ms, occurring in a fixed cycle, for example of two seconds. This causes the receiver unit 250 to enter into a receive ready state. Then the enabled carrier determination unit 246 determines the presence or absence of a received carrier, in accordance with the data received from the receiver unit 250 indicating the power intensity of the received RF signal carrier. When the RF ID tag 200 is not located near the reader/writer device 300, the carrier determination unit 246 detects no carrier (ND), and hence determines the absence of a carrier. In a period of time 51 intervening between two adjacent carrier sensing periods 50, the RF ID tag 200 enters into a sleep mode of operation, during which only the control unit 210 and the wakeup unit 270 are enabled or powered on, while the other elements 214-250 are disabled or powered down. The time length of the sleep period of time 51 may be shorter than the length of time between the ending time of a carrier sensing period 50 and the starting time of the next carrier sensing period 50.

When the RF ID tag 200 approaches the reader/writer device 300 so that the receiver unit 250 of the RF ID tag 200 receives an RF signal, the carrier determination unit 246 detects the carrier of the RF signal (DT) in the period for carrier sensing 52, and hence determines the presence of a carrier. In response to the resultant determination of the presence of a carrier, the receiver unit 250 and the data decoding unit 240 are enabled in the time period for the subsequent processing for reception 54 with a predetermined duration, for example, of 100 ms. Then, the enabled receiver unit 250 receives and demodulates the RF signal to thereby reproduce encoded data containing a command. The enabled data decoding unit 240 decodes the data in accordance with the predetermined encoding scheme, then obtains the command from the data, and then provides the command to the control unit 210. In response to the command, the control unit 210 enables the data generation unit 220 and the transmitter unit 230 in a time period or slot of processing for transmission 56 selected at random within a predetermined period of time, each time slot having a predetermined duration, for example, of 100 ms. The enabled data generation unit 220 generates data containing the tag ID (ID_tag) and other required information retrieved from the memory 214, and then encodes the data in accordance with the predetermined encoding scheme. The other required information may include information, such as commodity contents of a package and the number of the contents, a sender, transportation, a route and a destination. The enabled transmitter unit 230 modulates the carrier with the response data containing the tag ID, and then transmits the RF signal.

Referring to FIG. 3B, the receiver unit 350 of the reader/writer device 300 is always in the receive ready state 46. When the RF ID tag 200 approaches the reader/writer device 300 and the receiver unit 350 receives an RF signal, the receiver unit 350 demodulates the received RF signal in the time period of processing for reception 48 and generates encoded data. The data decoding unit 350 decodes the encoded data in accordance with the predetermined encoding scheme, then reproduces the response data containing the tag ID, and then provides the reproduced tag ID to the control unit 310. The control unit 310 provides the tag ID to the host computer. The host computer processes the tag ID to use for monitoring and managing the article distribution or the persons.

In general, the total time during which the RF ID tag 200 is not located near the reader/writer device 300 is significantly long. Thus, the active-type RF ID tag 200 is in a sleep mode of operation for the most time. This significantly reduces the power consumption of the active-type RF ID tag 200, and hence significantly increases the run time of the battery 290.

Figure 4:
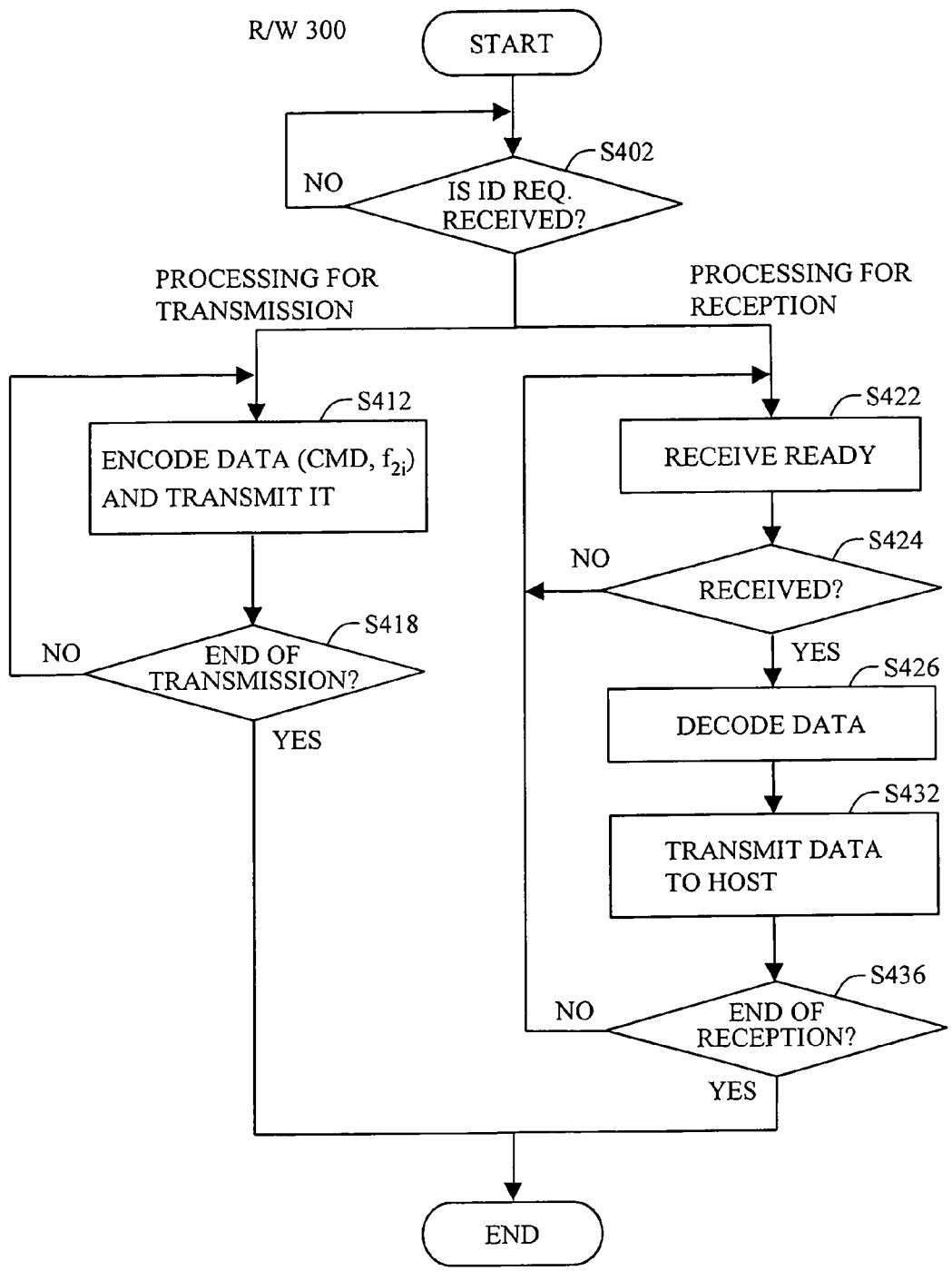
FIG. 4 shows a flow chart for the processing performed by the reader/writer device.
Figure 5A:
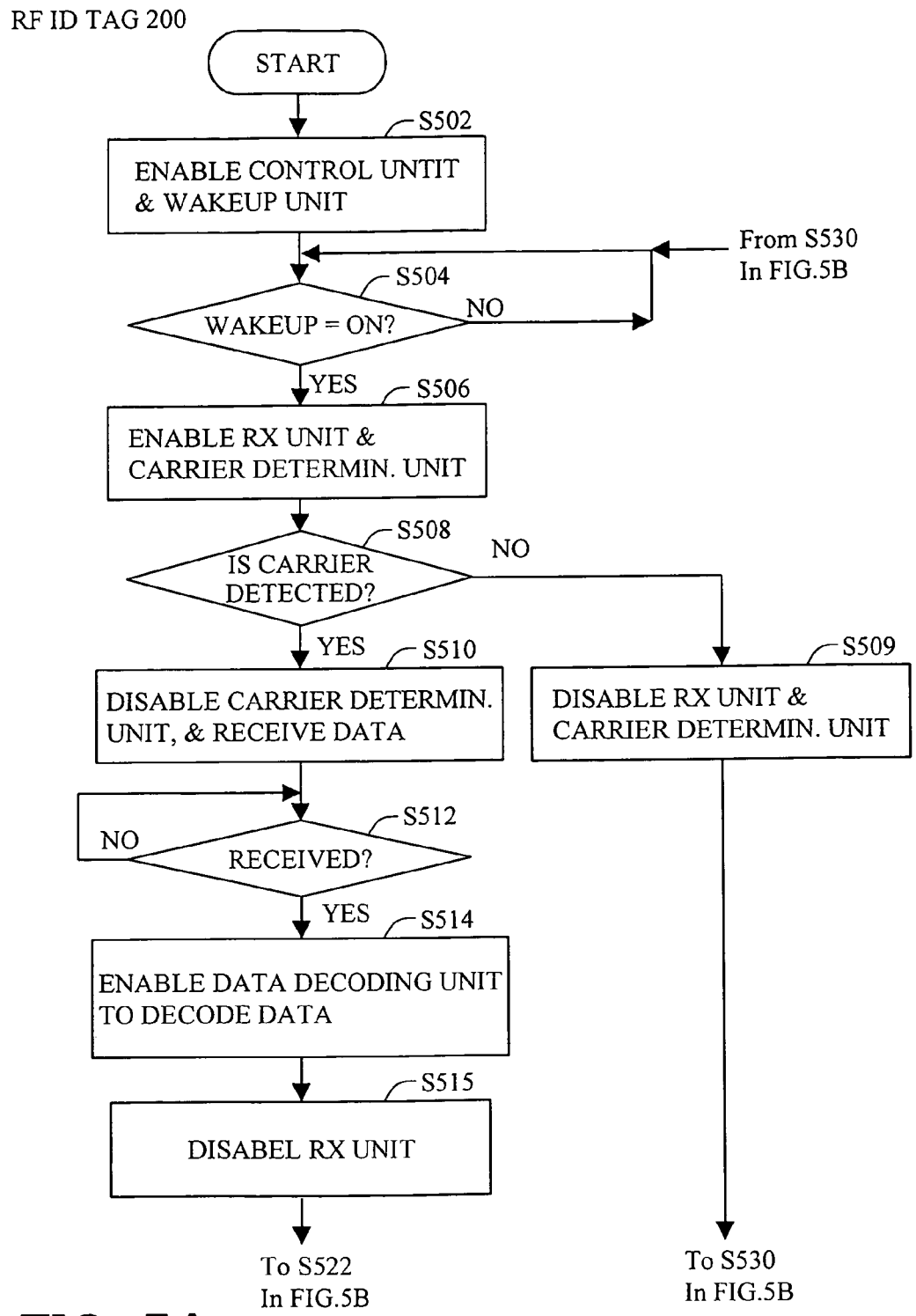
FIGS. 5A and 5B show a flow chart for the processing performed by the active-type RF ID tag.
Figure 5B:
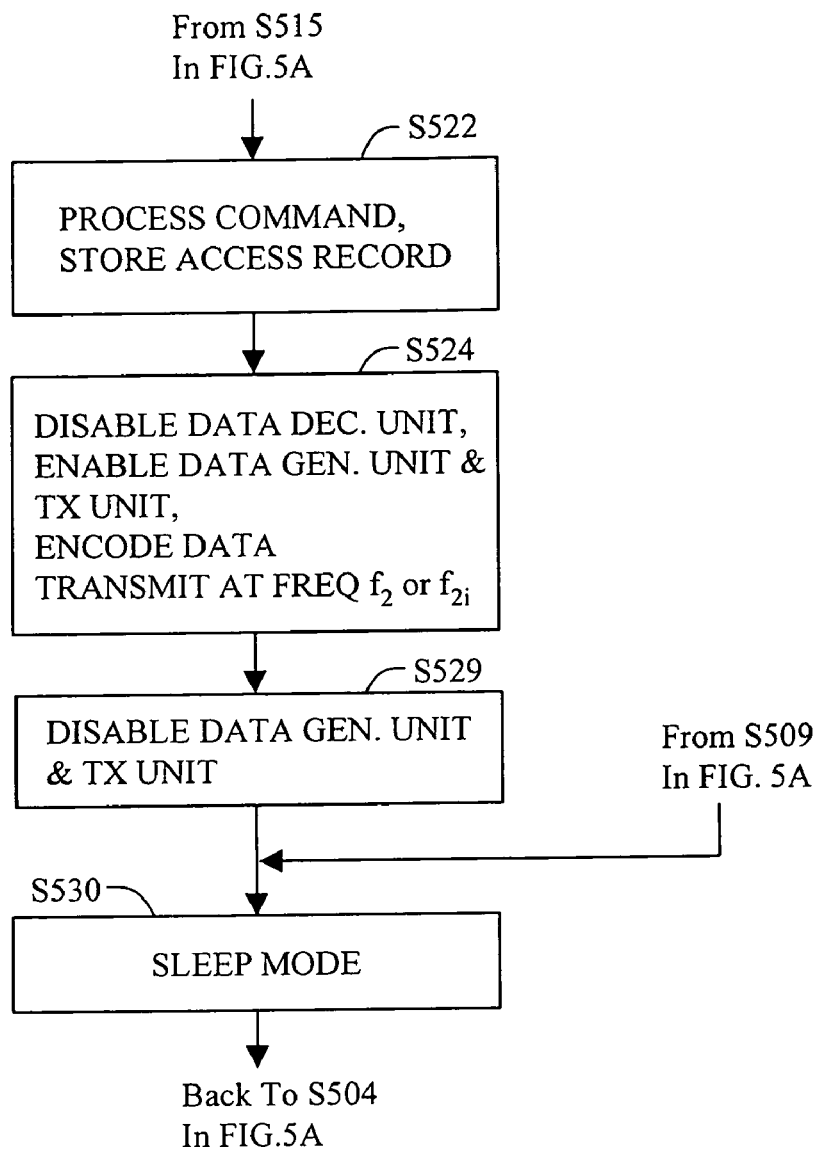

FIG. 4 shows a flow chart for the processing performed by the reader/writer device 300. FIGS. 5A and 5B show a flow chart for the processing performed by the active-type RF ID tag 200.

Referring to FIG. 4, at Step 402, the control unit 310 of the reader/writer device 300 determines whether a tag ID request command has been received from the host computer. The Step 402 is repeated until a request for the tag ID is detected. When a request for the tag ID is detected, the procedure proceeds to Step 412 for processing for transmission and to Step 422 for processing for reception.

At Step 412, the control unit 310 provides the ID request command and the related information to the data generation unit 320. The data generation unit 320 generates data containing the ID request command, and then encodes the generated data in accordance with a predetermined encoding scheme such as the NRZ (Non-Return-to-Zero) encoding system or the Manchester encoding system. The transmitter unit 330 modulates the carrier with the encoded data in the time slot of processing for transmission 42 of FIG. 3A, and then transmits the RF signal at a frequency $f_1$. The control unit 310 may incorporate, into the ID request command, data for specifying the transmission frequency $f_2$ or the variable transmission frequencies $f_{2i}$ used for a response to the ID request command; data indicative of time of day or time slots to be used for the variable transmission frequencies $f_{2i}$; data indicative of the current time of day T; and a control schedule and a time control sequence.

The reader/writer device 300 may change the frequencies $f_{2i}$ in the order in a time division manner, selecting one of the frequencies for every set of commands in respective transmission cycles $t_{RW-CY}$, the number of which corresponds to the time length of one or more cycles of sensing a carrier. This reduces the probability of collision between response RF signals transmitted from a plurality of RF ID tags which simultaneously approach to it. This increases the number of RF ID tags that the reader/writer device 300 can simultaneously identify.

At Step 418, the control unit 210 determines whether the processing for data transmission is to be terminated. If it is determined that the data transmission is terminated, the procedure exits this routine. If it is determined that the processing for data transmission is to be continued, the procedure returns to Step 412. In FIG. 3A, the data transmission is repeated and continued.

Referring to FIG. 5A, at Step 502, when the RF ID tag 200 is activated, the control unit 210 and the wakeup unit 270 are enabled. Once the RF ID tag 200 is activated, the control unit 210 and the wakeup unit 270 are always enabled, and hence in an active state. In accordance with the timer 274 and with the time control sequence, the wakeup unit 270 provides the control unit 210 with a wakeup signal indicative of the timing for carrier sensing of a received RF signal in a predetermined cycle. At Step 504, the control unit 210 determines whether the wakeup signal received from the wakeup unit 270 indicates an ON state. The control unit 210 repeats the Step 504 until the wakeup signal goes to the ON state.

If it is determined at Step 504 that the wakeup signal indicates the ON state, then the control unit 210 at Step 506 enables the receiver unit 250 and the carrier determination unit 246 for a short duration, for example, of approximately 1-10 ms. Then, the enabled receiver unit 250 enters into the state of being ready to receive an RF signal. In accordance with the data received from the receiver unit 250 that is indicative of the received carrier power, the enabled carrier determination unit 246 determines the presence or absence of a received RF signal carrier, and then provides the resultant determination to the control unit 210. At Step 508, in accordance with the resultant determination, the control unit 210 determines whether a carrier is detected. If it is determined that no carrier is detected, the control unit 210 at Step 509 disables the receiver unit 250 and carrier determination unit 246. After that, the procedure proceeds to Step 530.

If it is determined at Step 508 that a carrier is detected, then the control unit 210 at Step 510 disables carrier determination unit 246 and maintains to enable the receiver unit 250 in a further predetermined duration, for example of 100-200 ms, to receive an RF signal at a frequency $f_1$ carrying a command from the reader/writer device 300 (reception 54 in FIG. 3C), and then demodulates the received RF signal. At Step 512, the control unit 210 determines whether the receiver unit 250 has received the RF signal. The Step 512 is repeated until the reception of the RF signal is completed.

If it is determined at Step 512 that the RF signal has been received, then, the control unit 210 at Step 514 enables the data decoding unit 240, while the enabled data decoding unit 240 receives the received data from the receiver unit 250 under the control of the control unit 210, and then decodes the data in accordance with the predetermined encoding scheme. At Step 515, the control unit 210 disables the receiver unit 250.

Referring to FIG. 5B, at Step 522, the control unit 210 receives the decoded data containing the ID request command from the data decoding unit 240, then processes the received command contained in the decoded data, and then stores into the memory 214 the record of access performed by the reader/writer device 300. When a time correction command and the current time-of-day information T are contained in the received data, the control unit 210 corrects or updates the time of the timer 274 of the wakeup unit 270 into the time T.

At Step 524, the control unit 210 disables the data decoding unit 240, and in accordance with the ID request command, enables the data generation unit 220 and the transmitter unit 230 in a time slot selected in accordance with a random number from a predetermined number of time slots (e.g., five time slots each having a width of 100 ms) within the predetermined duration (e.g., 500 ms). Such a random number is generated by the random number generator unit 211. This selected time slot corresponds to the time period of the processing for transmission 56 of FIG. 3C. In accordance with the predetermined encoding scheme, the enabled data generation unit 220 encodes the data containing the tag ID (ID_tag) of the RF ID tag 200 read out from the memory 214, and then provides the data to the transmitter unit 230. The enabled transmitter unit 230 modulates the carrier with the data containing the tag ID, and then transmits via the antenna 284 an RF signal or RF signals at the predetermined frequency $f_2$ or specified frequency $f_{2i}$. The frequency $f_{2i}$ is changed by the frequency changing unit 212 of the control unit 210. The timing unit 213 adjusts a plurality of successive cycle time slots to occur in a predetermined cycle.

At Step 529, the control unit 210 disables the data generation unit 220 and the transmitter unit 230. At Step 530, the control unit 210 causes the RF ID tag 200 to enter into the sleep mode of operation. In the sleep mode, basically, the control unit 210 and the wakeup unit 270 solely are maintained in the enabled state, while the other elements 214-250 are disabled.

Referring back to FIG. 4, at Step 422, the control unit 310 enables the receiver unit 350 to enter into the receive ready state. The receiver unit 350 waits for the reception of an RF signal at a frequency $f_2$ (receive ready 46), and then receives an RF signal (processing for reception 48). At Step 424, the control unit 310 determines whether the receiver unit 350 has received the RF signal. The Step 424 is repeated until the reception is completed. If it is determined that the RF signal has been received, the receiver unit 350 at Step 426 provides the received data to the data decoding unit 340. The data decoding unit 340 decodes the received data in accordance with the predetermined encoding scheme to thereby reproduce the response data, and then provides notification of the data reception and the response data to the control unit 310.

At Step 432, the control unit 310 transmits the decoded data to the host computer. At Step 436, the control unit 310 determines whether the data receive ready state is to be terminated. If it is determined that the data receive ready state is to be terminated, the procedure exits this routine. If it is determined that the data receive ready state is to be continued, the procedure returns to Step 422. In FIG. 3B, the data receive ready state is repeated and continued.

Thus, the reader/writer device 300 performs transmission cyclically at sufficiently short intervals, and is always in the receive ready state. This reduces significantly the carrier sensing time of the RF ID tag 200. Thus, when the transmission and reception take place only several times a day, for example, for entry and exit control, the most operating time is used for carrier sensing, and hence the entire power consumption of the RF ID tag 200 is reduced significantly.

In a control schedule stored in the memory 214, the holidays and a period of time between a predetermined time point and another predetermined time point in the night-time (e.g., 6:00 pm to 6:00 am) of the weekdays may be specified, while a period of time between a predetermined time point and another predetermined time point in the daytime (e.g., 6:00 am to 6:00 pm) of the weekdays may be specified. In this case, the wakeup unit 270 generates no wakeup signal on the holidays and in the night-time, i.e., the RF ID tag 200 is in a deeper sleep mode of operation, and does not perform carrier sensing at all. In contrast, it performs carrier sensing in a predetermined cycle (e.g., of one second) in the daytime of the weekdays.

Under the control of the control unit 210, the wakeup unit 270 may generate a wakeup signal depending on the remaining power level of the battery 290 stored in the memory 214. In this case, when the remaining battery power level is sufficient, carrier sensing may be performed in a relatively short cycle (e.g., of one second), while, when the remaining battery power level goes below a threshold, carrier sensing may be performed in a relatively long cycle (e.g., of two seconds). Further, data representative of the remaining battery power level may be incorporated into the response data of the RF ID tag 200, and then provided to the host computer via the reader/writer device 300, so that the host computer displays a warning of battery run-out to a user.

When the records of accesses performed by the reader/writer devices are stored as a log of accesses in the memory 214 as described above, even an unauthorized access performed by a reader/writer device other than the reader/writer device 300 can be recorded as the log. Thus, when the log of accesses is read by the reader/writer device 300 and then analyzed by the host computer, the unauthorized access can be recognized.

Figure 6:
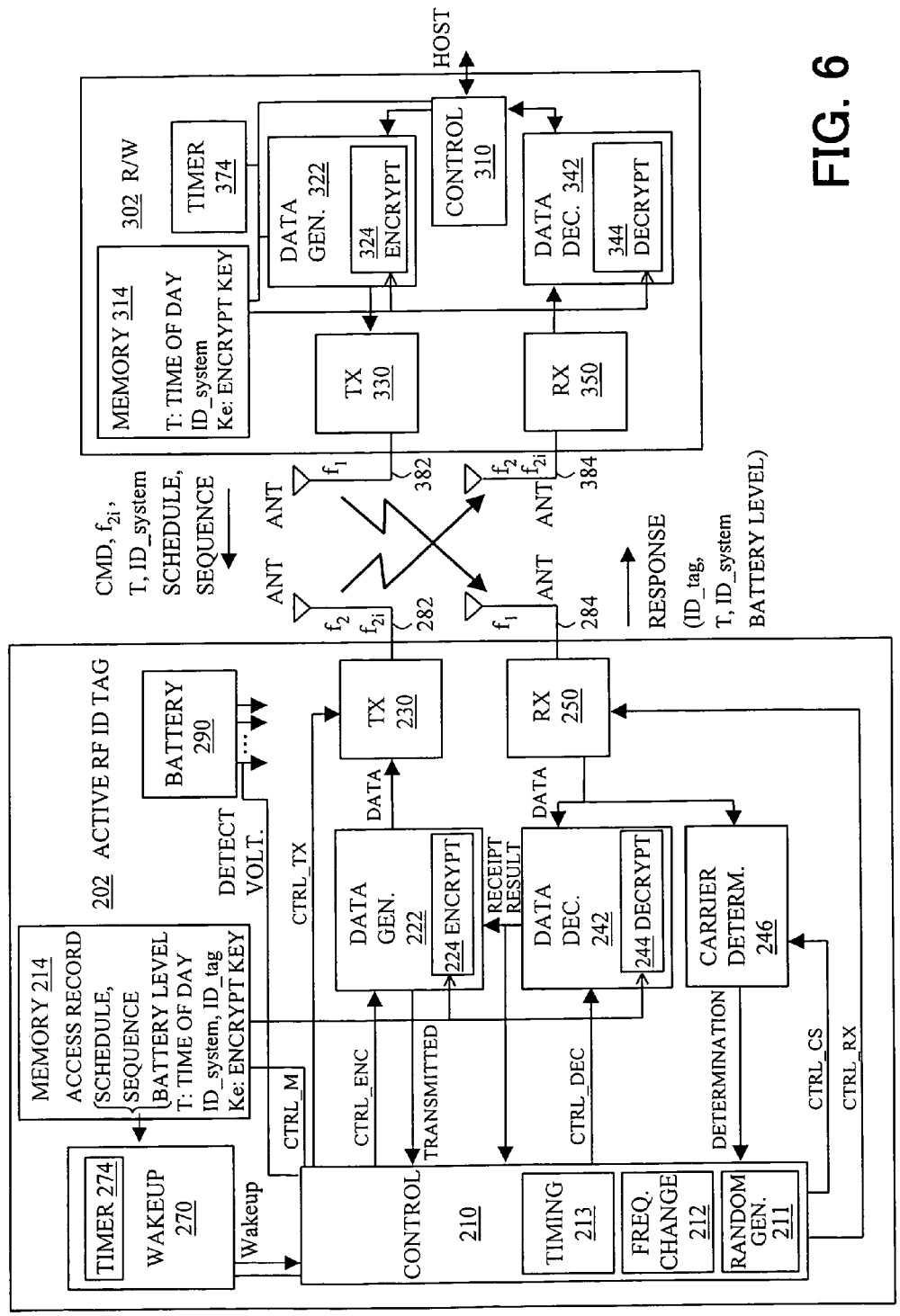
FIG. 6 shows modification of the configurations of FIG. 2, and illustrates the configurations of a more secure active-type RF ID tag and of a reader/writer device.

FIG. 6 shows modification of the configurations of FIG. 2, and illustrates the configurations of a more secure active-type RF ID tag 202 and of a reader/writer device 302. In these configurations, the data transmitted between the RF ID tag 202 and the reader/writer device 302 is encrypted, and the received data is decrypted to be used for authentication.

The RF ID tag 202 includes a data generation unit 222 in place of the data generation unit 220 in the RF ID tag 200 of FIG. 2, and includes a data decoding unit 242 in place of the data decoding unit 240 of FIG. 2. In addition to the tag ID (ID_tag), the memory 214 of the RF ID tag 202 stores the current time-of-day information T for authentication, a system ID (ID_system) for authentication, and an encryption/decryption key Ke. The memory 214 provides these pieces of information to the data generation unit 222 and the data decoding unit 242. The current time-of-day information T for authentication, the system ID for authentication, and the encryption/decryption key Ke described here are transmitted to the RF ID tag 202 by the reader/writer device 302 beforehand, and then written into the memory 214 by the control unit 210 beforehand. The data generation unit 222 includes an encryption unit 224 for encrypting the data to be transmitted, with the encryption key Ke stored in the memory 214 in accordance with a predetermined cryptosystem. The data decoding unit 242 includes a decryption unit 244 for decrypting the received data with the encryption/decryption key Ke in accordance with the predetermined cryptosystem. The other elements in the configuration of the RF ID tag 202 are similar to those of the RF ID tag 200, and hence are not described again. The system ID indicates a common ID shared by the same group consisting of the reader/writer device 302 and a plurality of RF ID tags including the RF ID tag 202. The common key cryptosystem is employed as the predetermined cryptosystem herein. Alternatively, the public key cryptosystem may be employed.

The reader/writer device 302 includes a data generation unit 322 in place of the data generation unit 320 in the reader/writer device 300 of FIG. 2, and includes a data decoding unit 342 in place of the data decoding unit 340 of FIG. 2. The memory 314 of the reader/writer device 302 stores the current time-of-day information T for authentication, the system ID (ID_system) for authentication, and an encryption/decryption key Ke. The data generation unit 324 includes an encryption unit 322 for encrypting the data to be transmitted, with the encryption key Ke stored in the memory 314 in accordance with the predetermined cryptosystem. The data decoding unit 342 includes a decryption unit 344 for decrypting the received data with the encryption/decryption key Ke in accordance with the predetermined cryptosystem. The other elements in the configuration of the reader/writer device 302 are similar to those of the reader/writer device 300, and hence are not described again.

Figure 7:
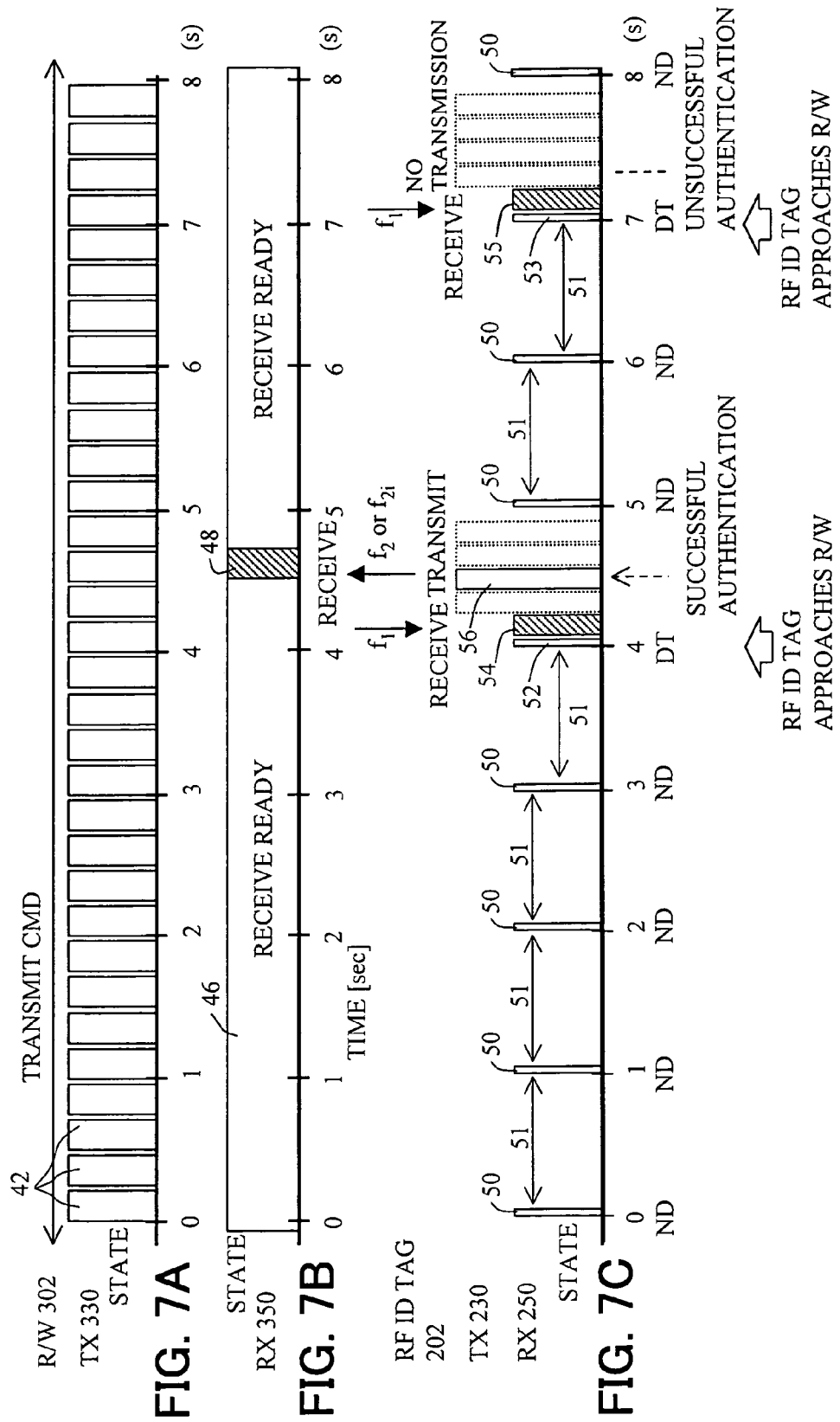
FIG. 7A shows a time chart of processing for transmission for an RF signal carrying a command (CMD) transmitted from the reader/writer device.
FIG. 7B shows a time chart of a receive ready state and of processing for reception of a received RF signal in the reader/writer device.
FIG. 7C shows a time chart of carrier sensing, processing for reception of received RF signals, and processing for transmission of an RF signal carrying a response in the case of successful authentication, in the active-type RF ID tag.

FIG. 7A shows a time chart of processing for transmission 42 for an RF signal carrying a tag ID request command (CMD) transmitted from the reader/writer device 302. FIG. 7B shows a time chart of a receive ready state 46 and of processing for reception 48 of a received RF signal in the reader/writer device 302. FIG. 7C shows a time chart of carrier sensing 50, 52 and 53, processing for reception 54 and 55 of received RF signals, and processing for transmission 56 of an RF signal carrying a response in the case of successful authentication, in the active-type RF ID tag 202.

Referring to FIG. 7A, the data generation unit 322 of the reader/writer device 302 generates data containing a tag ID request command for the RF ID tag that is received from the control unit 310, and encodes the data in accordance with the predetermined encoding scheme to thereby generate encoded encrypted data. The other transmission operation of the reader/writer device 302 is similar to that of the reader/writer device 300 of FIG. 3A.

Referring to FIG. 7C, in the active-type RF ID tag 202, the operations of the receiver unit 250 and carrier determination unit 246 are similar to those shown in FIG. 3C. Thus, in response to a wakeup signal from the wakeup unit 274, the receiver unit 250 and the carrier determination unit 246 are enabled by the control unit 210 in the periods for carrier sensing 50, 52 and 53 with the predetermined duration occurring in the fixed cycle, so that the enabled receiver unit 250 enters into a receive ready state.

In response to the resultant determination of the presence of a carrier (DT) made by carrier determination unit 246, the receiver unit 250 and the data decoding unit 242 are enabled in a predetermined time period for the subsequent processing for reception 54 and 55 with the predetermined duration. The enabled receiver unit 250 receives and demodulates the RF signal, to thereby reproduce encoded encrypted data containing the command. The enabled data decoding unit 242 decodes the data in accordance with the predetermined encoding scheme, then decrypts the encrypted data with the encryption/decryption key Ke in accordance with the predetermined cryptosystem to thereby reproduce the command, and then provides the command to the control unit 210. In response to reception of the command, the control unit 210 authenticates the reader/writer device 302 in accordance with the time-of-day information T and the system ID contained in the command.

When the authentication has been successful, the data generation unit 222 and the transmitter unit 230 are enabled in a time slot of processing for transmission 56 selected at random within a predetermined period of time, each time slot having a predetermined duration. The data generation unit 222 encrypts data containing the tag ID (ID_tag), the time-of-day information T, and the system ID (ID_system) retrieved from the memory 214, with the encryption key Ke in accordance with the predetermined cryptosystem, and then encodes the encrypted data in accordance with the predetermined encoding scheme. The transmitter unit 230 modulates the carrier with the encrypted response data containing the tag ID, and then transmits the RF signal. When the authentication has been unsuccessful, the processing is terminated without generating or transmitting the data.

Referring to FIG. 7B, the receiver unit 350 of the reader/writer device 302 is always in the receive ready state 46. When the RF ID tag 202 approaches the reader/writer device so that the receiver unit 350 receives an RF signal, the receiver unit 350 demodulates the received RF signal in the time period of processing for reception 48, and then reproduces encoded encrypted data. The data decoding unit 342 decodes the encoded encrypted data in accordance with the predetermined encoding scheme, then decrypts the decoded encrypted data with the encryption/decryption key Ke in accordance with the predetermined cryptosystem to thereby reproduce the response data containing the tag ID, and then provides the reproduced response to the control unit 310. In response to the received and reproduced response, the control unit 310 authenticates the RF ID tag 202 in accordance with the time-of-day information T and the system ID contained in the response, and then provides the tag ID and other information to the host computer.

In general, when the reader/writer device 302 and the RF ID tag 202 encrypt the data to be transmitted and perform mutual authentication in accordance with the time-of-day information T and the system ID as described above, the data transmitted by the reader/writer device 302 and the RF ID tag 202, which is intercepted by a third party, has little risk of being decrypted and used improperly. This enhances the security of the reader/writer device 302 and the RF ID tag 202.

Figure 8:
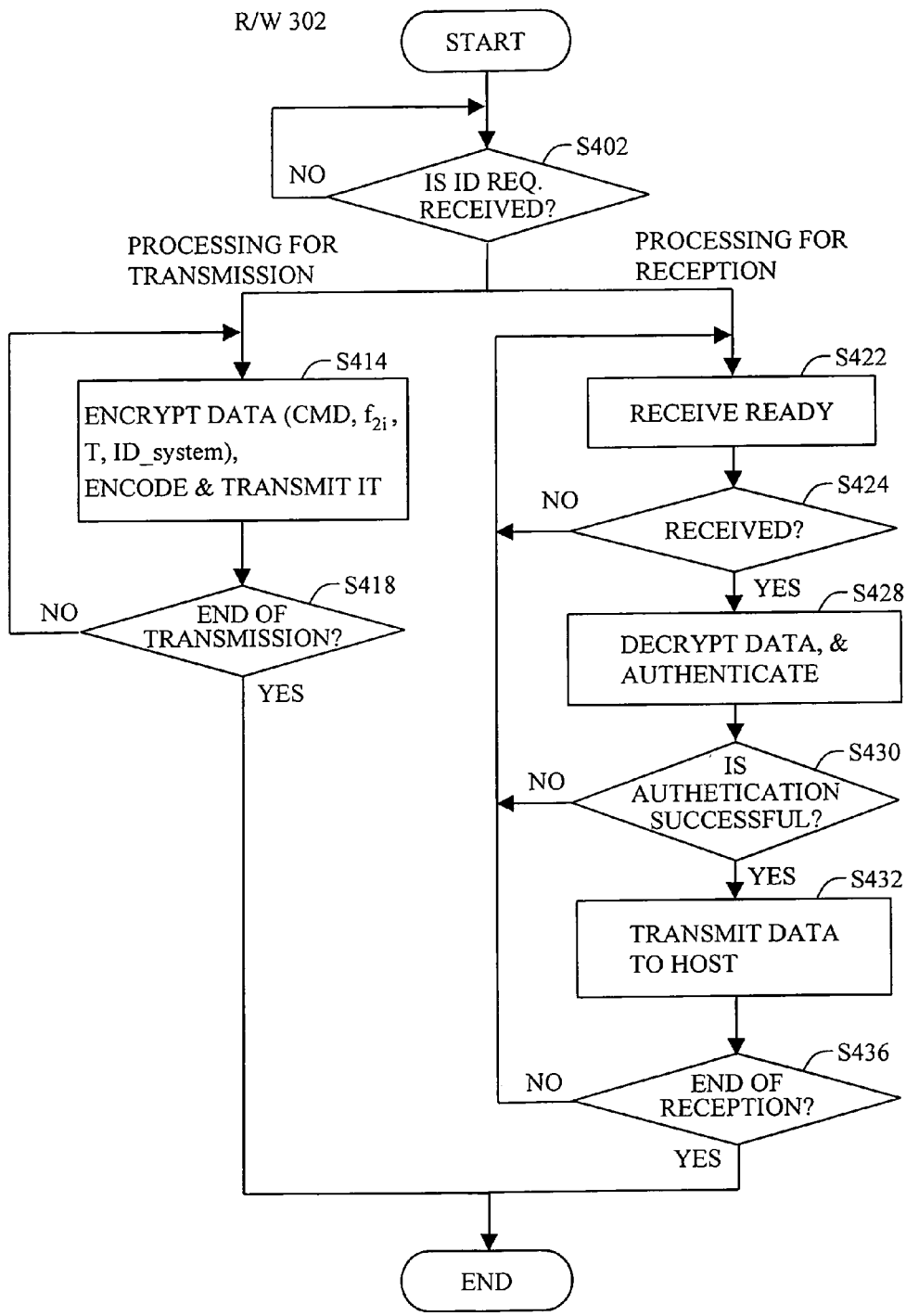
FIG. 8 shows a flow chart for the processing performed by the reader/writer device.
Figure 9A:
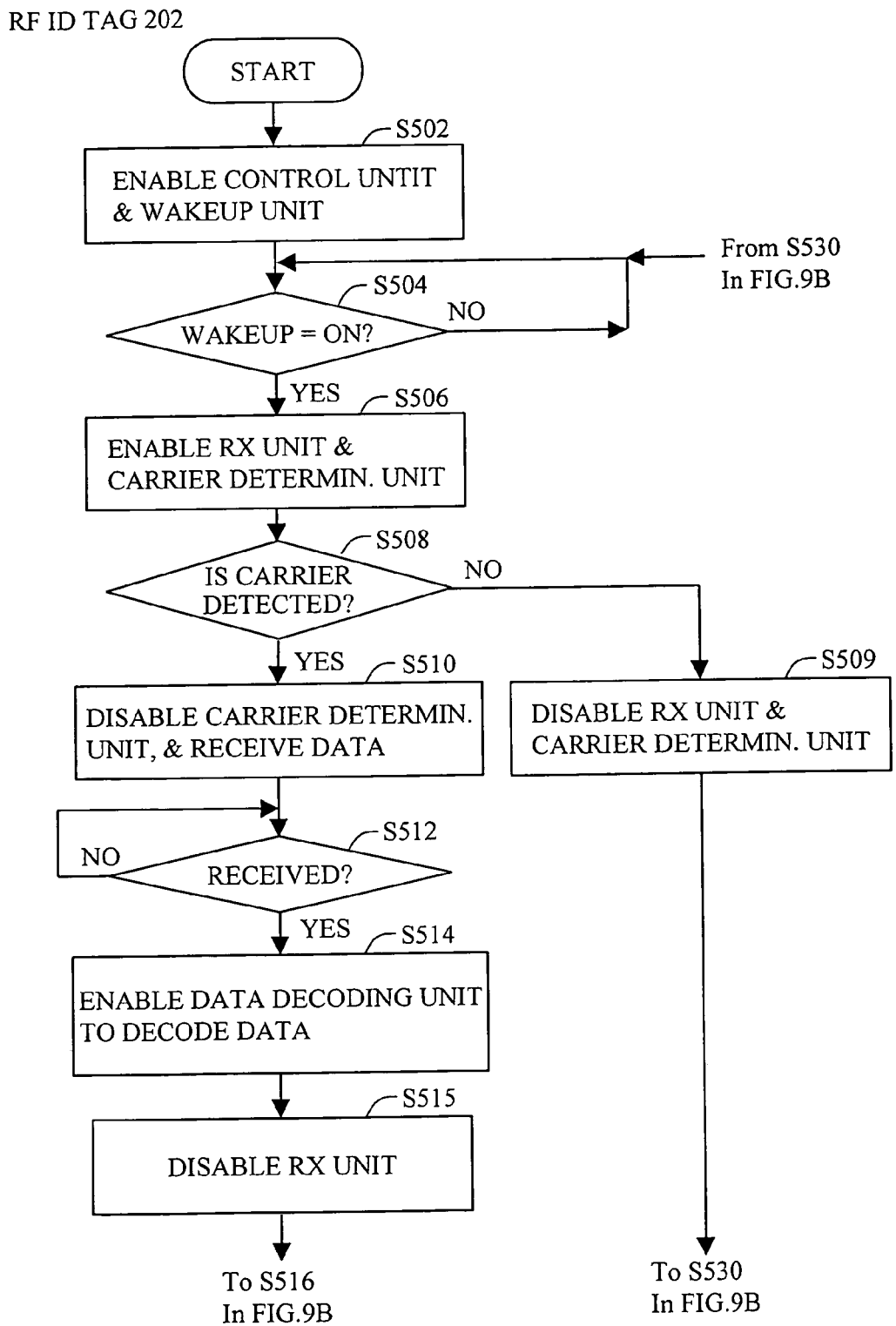
FIGS. 9A and 9B show a flow chart for the processing performed by the active-type RF ID tag.
Figure 9B:
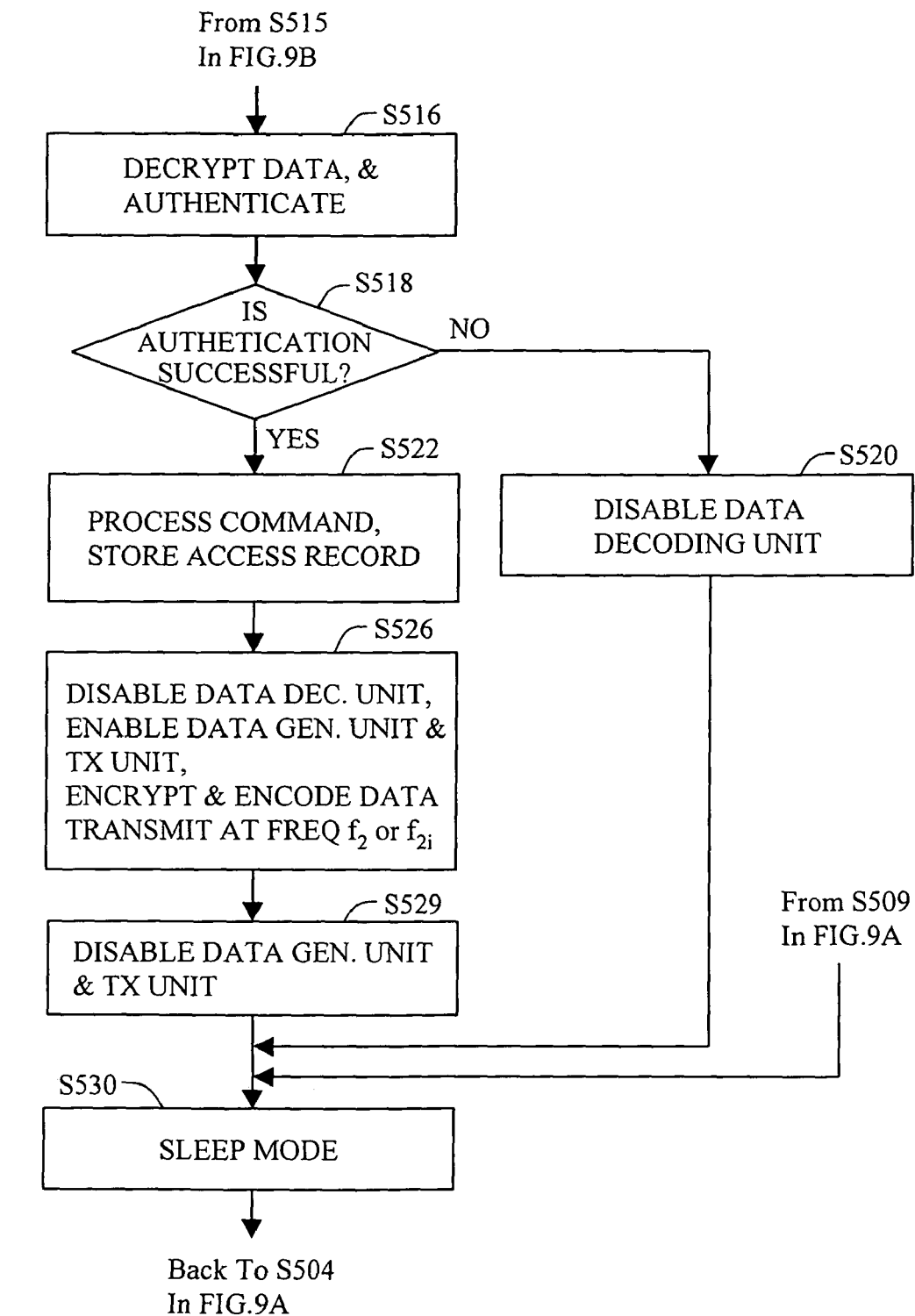

FIG. 8 shows a flow chart for the processing performed by the reader/writer device 302. FIGS. 9A and 9B show a flow chart for the processing performed by the active-type RF ID tag 202.

Referring to FIG. 8, Step 402 is similar to that of FIG. 4, and hence is not described again. At Step 414, the control unit 310 provides the ID request command to the data generation unit 322. The data generation unit 322 encrypts data containing the ID request command received from the control unit 310 and containing the current time-of-day information T and the system ID (ID_system) retrieved from the memory 314, with the encryption key Ke retrieved from the memory 314 in accordance with a predetermined cryptosystem, such as the DES (Data Description Standard), the Triple DES or the AES (Advanced Encryption Standard). Then, the data generation unit 322 encodes the encrypted data to thereby generate encoded data. The transmitter unit 332 modulates the carrier with the encrypted data, and then transmits the RF signal at the frequency $f_1$ (processing for transmission 42 in FIG. 7A). Step 418 is similar to that of FIG. 4, and hence is not described again.

Referring to FIG. 9A, Steps 502 through 515 are similar to those of FIG. 5, and hence are not described again.

Referring to FIG. 9B, at Step 516, under the control of the control unit 210, the data decoding unit 242 decrypts the decoded data with the encryption/decryption key Ke retrieved from the memory 214 in accordance with the predetermined cryptosystem, and then provides the decrypted data containing the command, the tag ID (ID_tag), the time-of-day information T, and the system ID (ID_system) to the control unit 210. The data may contain a control schedule and a time control sequence. Upon receiving the data, the control unit 210 compares the decrypted time-of-day T and system ID with the stored time-of-day T and system ID in the memory 214, to determine whether the decrypted time information and ID match with the stored time information and ID, in order to authenticate the reader/writer device 302.

At Step 518, the control unit 210 determines whether the authentication has been successful. If it is determined that authentication has been unsuccessful, the control unit 210 at Step 520 disables the data decoding unit 242. Then, the procedure proceeds to Step 530 of FIG. 9B.

If it is determined at Step 518 that the authentication has been successful, then the control unit 210 at Step 522 receives from the data decoding unit 242 the decrypted data containing the ID request command, then processes the decrypted received command contained in decoded data, and then stores into the memory 214 the record of access from the reader/writer device 302.

At Step 526, in accordance with the ID request command, the control unit 210 enables the data generation unit 222 and the transmitter unit 230 in a time slot selected at random in accordance with a random number from a predetermined number of time slots within a predetermined period of time. This selected time slot corresponds to the time period of the processing for transmission 56 of FIG. 7C. The data generation unit 222 encrypts data containing the tag ID (ID_tag) of the RF ID tag 202, the time-of-day information T and the system ID (ID_system) read out from the memory 214, with the encryption key Ke in accordance with the predetermined cryptosystem, then encodes the encrypted data in accordance with the predetermined encoding scheme, and then provides the encoded encrypted data to the transmitter unit 230. The transmitter unit 230 modulates the carrier with the encoded encrypted data, and then transmits the RF signal at a frequency $f_2$ via the antenna 284 (transmission 56 in FIG. 7C). Steps 528 and 530 are similar to those of FIG. 5, and hence are not described again.

Referring back to FIG. 8, Steps 422 through 424 are similar to those of FIG. 4, and hence are not described again. At Step 428, the receiver unit 350 provides the received data to the data decoding unit 342. The data decoding unit 342 decodes the received data in accordance with the predetermined encoding scheme, then decrypts the decoded data in accordance with the predetermined cryptosystem, and then provides the data reception and the decrypted data to the control unit 310. The control unit 310 compares the decrypted time T and system ID with the stored time T and system ID in the memory 314, to determine whether the decrypted time information and ID match with the stored time information and ID, in order to authenticate the RF ID tag 202. Even if there is an error between the received time-of-day information T and the stored time-of-day information T that falls within a predetermined range (e.g., ±0.5 seconds) in the control unit 210 of the RF ID tag 202 and in the control unit 310 of the reader/writer device 302, they may determine that the received time-of-day information matches with the stored time-of-day information.

At Step 430, the control unit 310 determines whether the authentication has been successful. If it is determined that the authentication has been unsuccessful, the procedure returns to Step 422. If it is determined that the authentication has been successful, the procedure proceeds to Step 432. Step 436 is similar to that of FIG. 4, and hence is not described again.

Figure 10:
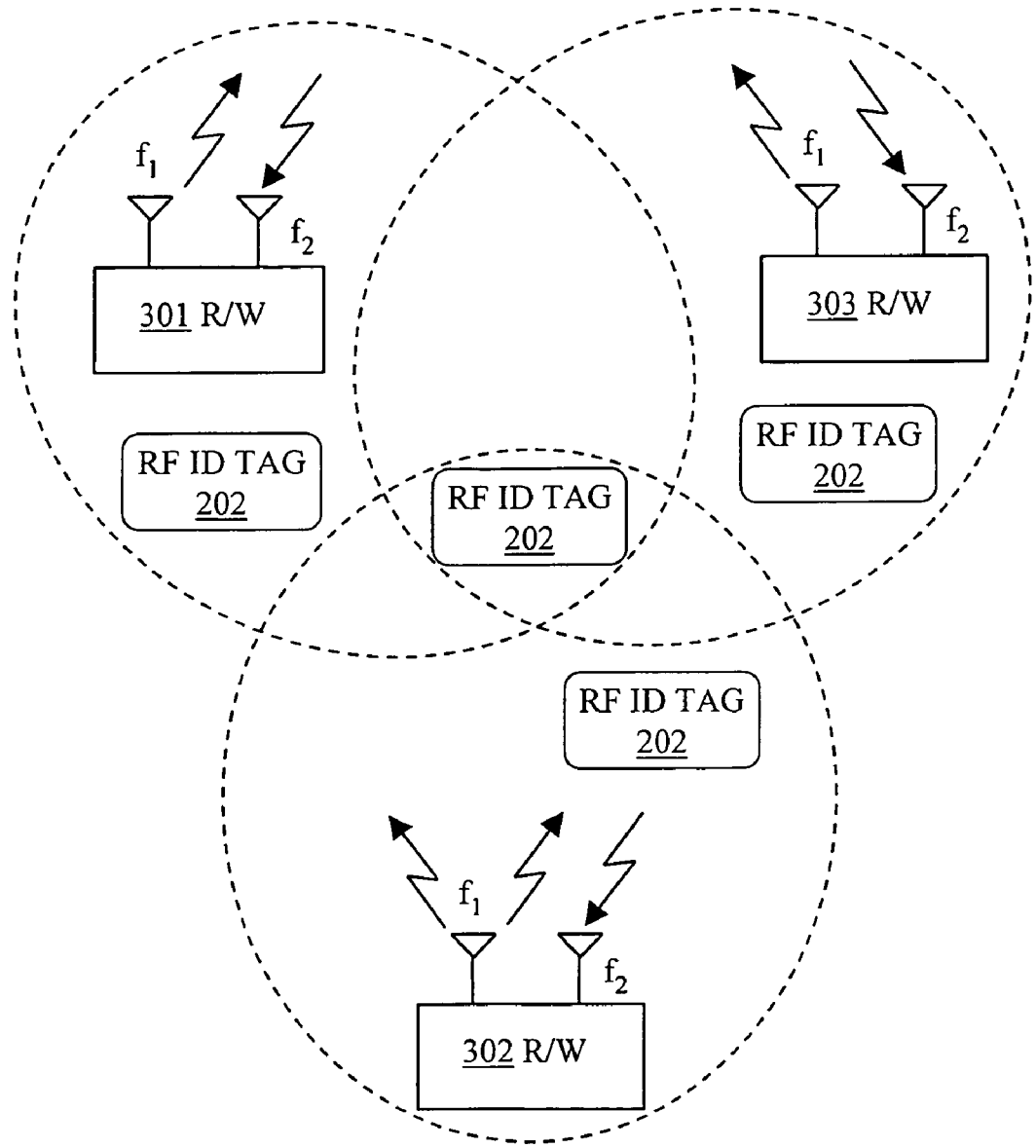
FIG. 10 shows an RF ID tag located in the communication ranges of a plurality of reader/writer devices having the same configuration and disposed at different positions.

FIG. 10 shows an RF ID tag 202 located in any of the communication ranges of a plurality of reader/writer devices 301, 302 and 303 having the same configuration and disposed at different positions. The communication ranges are indicated by closed broken lines. These reader/writer devices are employed to detect RF ID tags in a larger area. When the RF ID tag 202 is located in the overlapped region of the communication ranges of the reader/writer devices 301, 302 and 303, ID request signals at the same frequency $f_1$ from the reader/writer devices 301, 302 and 303 received by the RF ID tag 202 interfere with each other. Thus, the RF ID tag 202 cannot normally receive these ID request signals, and hence the RF ID tag 202 cannot transmit response signals.

The inventors have recognized that a plurality of reader/writer devices may be adapted to transmit RF signals at one transmitting frequency $f_1$ carrying respective tag ID requests in respective different periods of time for transmission, to thereby reduce possible interference between the transmitted RF signals.

Figure 11:
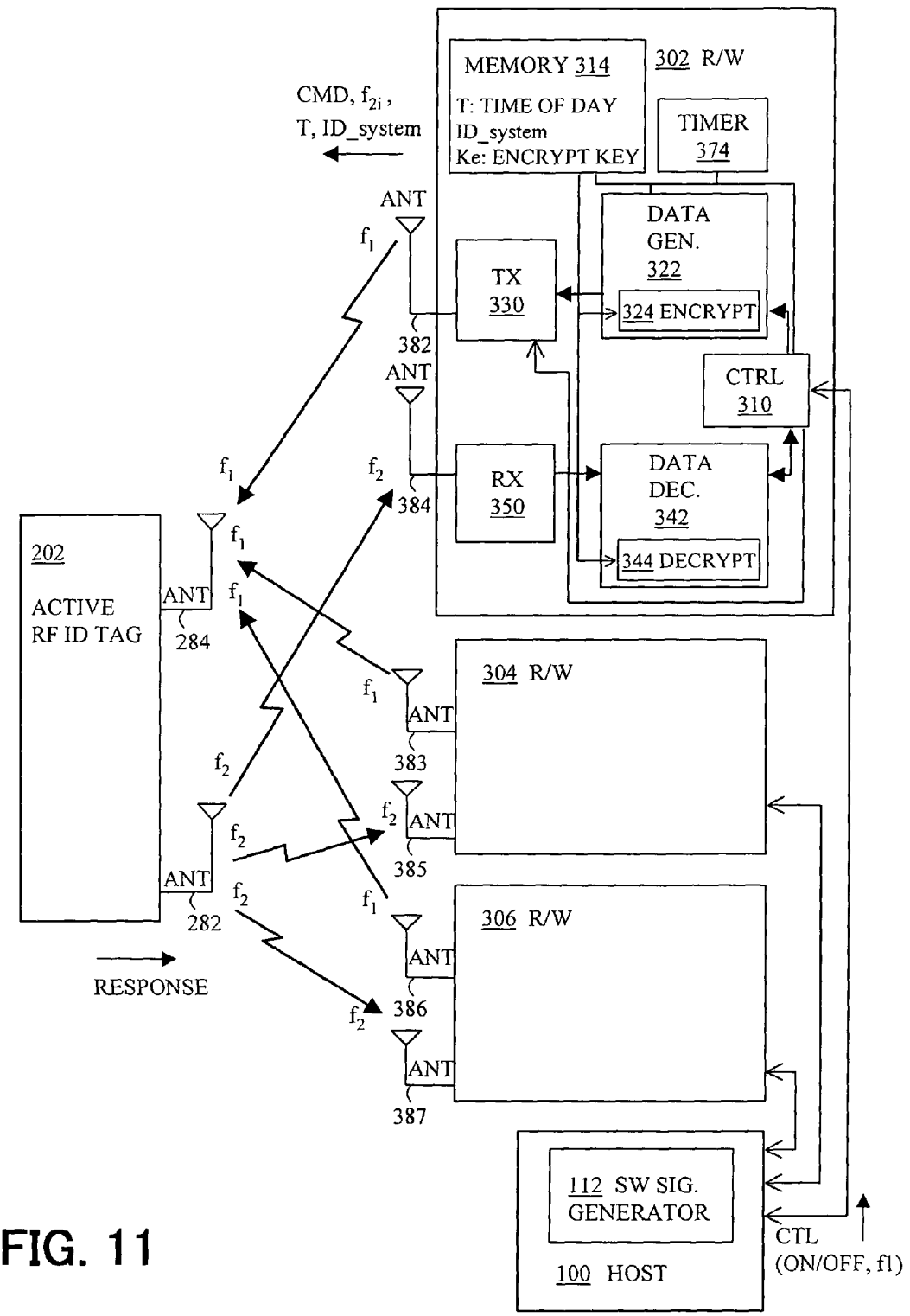
FIG. 11 shows a plurality of reader/writer devices and an active RF ID tag in accordance with an embodiment of the present invention.

FIG. 11 shows a plurality of reader/writer devices 302, 304 and 306 and an active RF ID tag 202 in accordance with an embodiment of the present invention. The reader/writer devices 304 and 306 have the same configuration as the reader/writer device 302 described above. The number of reader/writer devices is not limited to three, and may be two, four or more.

The reader/writer devices 302, 304 and 306 transmit the RF signals carrying the tag ID or information request commands at the frequency $f_1$ in respective different periods or durations of time t1, t2 and t3, and are always in ready states to receive RF response signals at a frequency $f_2$ or $f_{2i}$. The RF ID tag 202 has the configuration as shown in FIG. 6. The RF ID tag 202 cyclically performs carrier sensing at the frequency $f_1$, receives an RF signal carrying a tag ID or information request, and then transmits an RF signal carrying a response at a frequency $f_2$ or $f_{2i}$. The system IDs of the reader/writer devices 302, 304 and 306 are different from each other. In this case, the reader/writer devices 302, 304 and 306 are synchronized to each other in terms of the periods of time for transmission.

The reader/writer devices 302, 304 and 306 are connected to the same host apparatus or host computer 100. The host apparatus 100 has a switching signal generator unit 112. In response to a switching signal from the switching signal generator unit 112, the host apparatus 100 changes a control signal CTL to be provided to the reader/writer devices 302, 304 and 306.

Figures 12A, 12B, 12C:
FIG. 12A shows a time chart of a control signal provided from the host apparatus to the reader/writer devices in FIG. 11.
FIG. 12B shows a time chart of the operation state of the transmitter unit of each of the reader/writer devices.
FIG. 12C shows a time chart of sensing a carrier in the active RF ID tag.

FIG. 12A shows a time chart of a control signal CTL provided from the host apparatus 100 to the reader/writer devices 302, 304 and 306 in FIG. 11. FIG. 12B shows a time chart of the operation state of the transmitter unit 330 of each of the reader/writer devices 302, 304 and 306. FIG. 12C shows a time chart of sensing a carrier in the active RF ID tag 202.

As shown in FIG. 12A, the host apparatus 100 provides, to each of the reader/writer devices 302, 304 and 306, a control signal CTL that includes a system ID or an identifier of each of the reader/writer devices 302, 304 and 306, an indication of ON/OFF, and a value of the transmitting frequency $f_1$. In a first period of time t1 among cyclic periods of time t1, t2 and t3, each having a time length Tc such as one (1) second, the control signal CTL enables or turns ON the transmitter unit 330 of the reader/writer device 302, and then sets the transmitting frequency $f_1$ to the transmitter unit 330 thereof, while disabling or turning OFF the other reader/writer devices 304 and 306. In the second period of time t2, the control signal CTL enables the transmitter unit 330 of the reader/writer device 304, and then sets the transmission frequency $f_1$ to it, while disabling the other reader/writer devices 302 and 306. In the third period of time t3, the control signal CTL enables the transmitter unit 330 of the reader/writer device 306, and then sets the transmission frequency $f_1$ to it, while disabling the other reader/writer devices 302 and 304.

The transmitter unit 330 of each of the reader/writer devices 302, 304 and 306 transmits, repeatedly at sufficiently short intervals, an RF signal at the transmitting frequency $f_1$ carrying the command, in a corresponding one of the periods of time t1, t2 and t3 shown in FIG. 12B. As shown in FIG. 12C, the receiver unit 250 of the RF ID tag 202 operates to sense a carrier at the receiving frequency $f_1$ once or more times in a cycle Ts of 0.5 seconds for example, during the length of time Tc of each of the periods of time t1, t2 and t3. Thus, the cycle Ts of the carrier sensing in the receiver unit 250 is less than the length of time Tc of continuous transmission of each reader/writer device. This improves the reliability of carrier detection in the receiver unit 250 of the RF ID tag 202.

FIGS. 13A, 13C and 13E show a time chart of processing for transmission 42 of RF signals at one frequency $f_1$ carrying ID request commands (CMDs) in the reader/writer devices 302, 304 and 306 of FIG. 11. FIGS. 13B, 13D and 13F show a time chart of receive ready state 46 and of the processing for reception 48 of received RF signals at one frequency $f_2$ in the respective reader/writer devices 302, 304 and 306 of FIG. 11. FIG. 13G shows a time chart of carrier sensing 50 and 52, reception processing 54 of received RF signals, and transmission processing 56 for an RF signal carrying a response, in the active RF ID tag 202 which is passing near the reader/writer devices 302, 304 and 306 of FIG. 11.

Referring to FIGS. 13A, 13C and 13E, similarly to FIG. 7A, the data generation unit 320 of each of the reader/writer devices 302, 304 and 306 is enabled cyclically in a corresponding period of time t1, t2 or t3 as set by the control signal CTL from the host apparatus 100. Then, the data generation unit 320 generates data containing a tag ID request command for the RF ID tag received from the control unit 310, then encodes the data in accordance with a predetermined encoding scheme, and thereby generates encoded encrypted data. The data may include the ID of the corresponding one of the reader/writer devices 302, 304 and 306 in addition to its system ID. The transmitter unit 330 repeatedly transmits the RF signal carrying the command in the successive time slots at sufficiently short intervals in the processing for transmission 42.

Referring to FIG. 13G, in the RF ID tag 202, the receiver unit 250 and the carrier determination unit 246 are enabled by the control unit 210 in the periods for carrier sensing 50 and 52 with a predetermined duration, for example of approximately 1-10 ms, occurring in a cycle Ts, for example of 0.5 seconds, in response to the wakeup signal from the wakeup unit 270. Thus, the receiver unit 250 goes into a receive ready state at the receiving frequency $f_1$ so that the carrier determination unit 246 determines the presence or absence of a received carrier, in accordance with the data received from the receiver unit 250 indicating the power intensity of the received RF signal carrier.

When the RF ID tag 202 is not located near any of the reader/writer devices 302, 304 and 306, the carrier determination unit 246 detects no carrier (ND), and hence determines the absence of a carrier. Even if the RF ID tag 202 approaches any one of the reader/writer devices 302, 304 and 306, when the reader/writer device stops the transmission of an RF signal at the frequency $f_1$, the carrier determination unit 246 detects no carrier (ND), and hence determines the absence of a carrier. In this case, in the sleep period of time 51 after the carrier sensing 50, the RF ID tag 202 goes into the sleep mode of operation, so that the control unit 210 and the wakeup unit 270 are solely enabled or powered ON, while the other units 214-250 are disabled or powered down. The time length of the sleep period of time 51 may be shorter than the time length between the end time point of the carrier sensing period 50 and the start time point of the next carrier sensing period 50 or 52.

When the RF ID tag 202 enters into both of the communication ranges of the reader/writer devices 302 and 304 so that the receiver unit 250 of the RF ID tag 202 receives an RF signal at the frequency $f_1$ from the reader/writer device 302 in the period for carrier sensing 52 in the period of time t1 in FIG. 13G, the carrier determination unit 246 detects the carrier of the RF signal (DT), and hence determines the presence of a carrier. Further, when the receiver unit 250 of the RF ID tag 202 receives an RF signal at the frequency $f_1$ from the reader/writer device 304 in the period for carrier sensing 52 in the period of time t2 in FIG. 13G, the carrier determination unit 246 detects the carrier of the RF signal (DT), and hence determines the presence of a carrier.

When the RF ID tag 202 enters into both of the communication ranges of the reader/writer devices 304 and 306 so that the receiver unit 250 of the RF ID tag 202 receives an RF signal at the frequency $f_1$ from the reader/writer device 304 in the period for carrier sensing 52 in the period of time t2 in FIG. 13G, the carrier determination unit 246 detects the carrier of the RF signal (DT), and hence determines the presence of a carrier. Further, when the receiver unit 250 of the RF ID tag 202 receives an RF signal at the frequency $f_1$ from the reader/writer device 306 in the period for carrier sensing 52 in the period of time t3 in FIG. 13G, the carrier determination unit 246 detects the carrier of the RF signal (DT), and hence determines the presence of a carrier.

In response to the resultant determination of the presence of a carrier at the frequency $f_1$, similarly to the operation in FIG. 7C, the receiver unit 250 and the data decoding unit 240 are enabled in a predetermined time period, for example of 100 ms, in the period of the subsequent processing for reception 54, so that the receiver unit 250 receives and demodulates the RF signal, and thereby generates encoded data containing a command. The data decoding unit 240 retrieves an encryption/decoding key Ke (e.g., 9B45C83D) from the memory 214, then decodes the encoded data in accordance with the predetermined encoding scheme, then decrypts the encrypted data in accordance with the predetermined cryptosystem by using the encryption/decoding key Ke, thereby reproduces a command, and then provides the command to the control unit 210. In response to reception of this command, the control unit 210 authenticates the reader/writer device 304 by using the time-of-day information T and the system ID included in the command. In the authentication, the ID of the reader/writer device 302, 304 or 306 carried by the request RF signal may be used further.

Similarly to the operation in FIG. 7C, when the authentication has been successful, the control unit 210 enables, in response to the command, the data generation unit 220 and the transmitter unit 230 in a predetermined time period or slot of processing for transmission 56 selected at random within a predetermined period of time, each time slot having a predetermined duration, for example, of 100 ms. Then, the enabled data generation unit 220 generates data containing the tag ID (ID_tag) and other information retrieved from the memory 214, and then encodes the data in accordance with a predetermined encoding scheme. The enabled transmitter unit 230 modulates the carrier with the response data containing the tag ID, and then transmits an RF response signal at the frequency $f_2$ at the specified transmitting frequency $f_2$ (e.g., 316.0 MHz).

Referring to FIGS. 13B, 13D and 13F, in a second half of the period of time t1 and a first half of the period of time t2, similarly to the operation in FIG. 7B, the receiver unit 350 of each of the reader/writer devices 302 and 304 is always in a receive ready state 46, and receives an RF response signal at the frequency $f_2$ when the RF ID tag 202 approaches them. In a second half of the period of time t2 and a first half of the period of time t3, the receiver unit 350 of each of the reader/writer devices 304 and 306 is always in a receive ready state 46, and receives an RF response signal at the frequency $f_2$ when the RF ID tag 202 approaches them. When the receiver unit 350 of each reader/writer device receives the RF response signal at the frequency $f_2$, the receiver unit 350 thereof demodulates the received RF response signal and thereby generates encoded encrypted data in the time period of processing for reception 48. The data decoding unit 342 then decodes the encoded encrypted data in accordance with a predetermined encoding scheme, then decrypts the decoded encrypted data in accordance with a predetermined cryptosystem by using an encryption/decoding key Ke to thereby reproduce the response data containing the tag ID, and then provides the reproduced response to the control unit 310. In response to the received and reproduced response, the control unit 310 authenticates the RF ID tag 202 in accordance with the time information T and the system ID contained in the response. The control unit 310 then provides the tag ID and other information to the host apparatus 100. The host apparatus 100 performs redundancy filtering on the tag IDs to thereby process the non-redundant, filtered tag ID, so that the tag ID is used for monitoring and managing the article distribution or the persons.

Since the reader/writer devices 302, 304 and 306 transmit RF signals at the same transmission frequency $f_1$ in the time-division manner as described above, the RF ID tag 202 senses and receives only a carrier of an RF signal at one transmitting frequency $f_1$ at one time. This significantly reduces the possible interference between transmitted RF signals from the reader/writer devices 302, 304 and 306. In addition, the cycle Ts of carrier sensing in the receiver unit 250 of the RF ID tag 202 is shorter than the time length Tc of the continuous transmission in each of the reader/writer devices 302, 304 and 306. This further improves the probability of detection of the RF ID tag 202 in the reader/writer devices.

Figure 14:
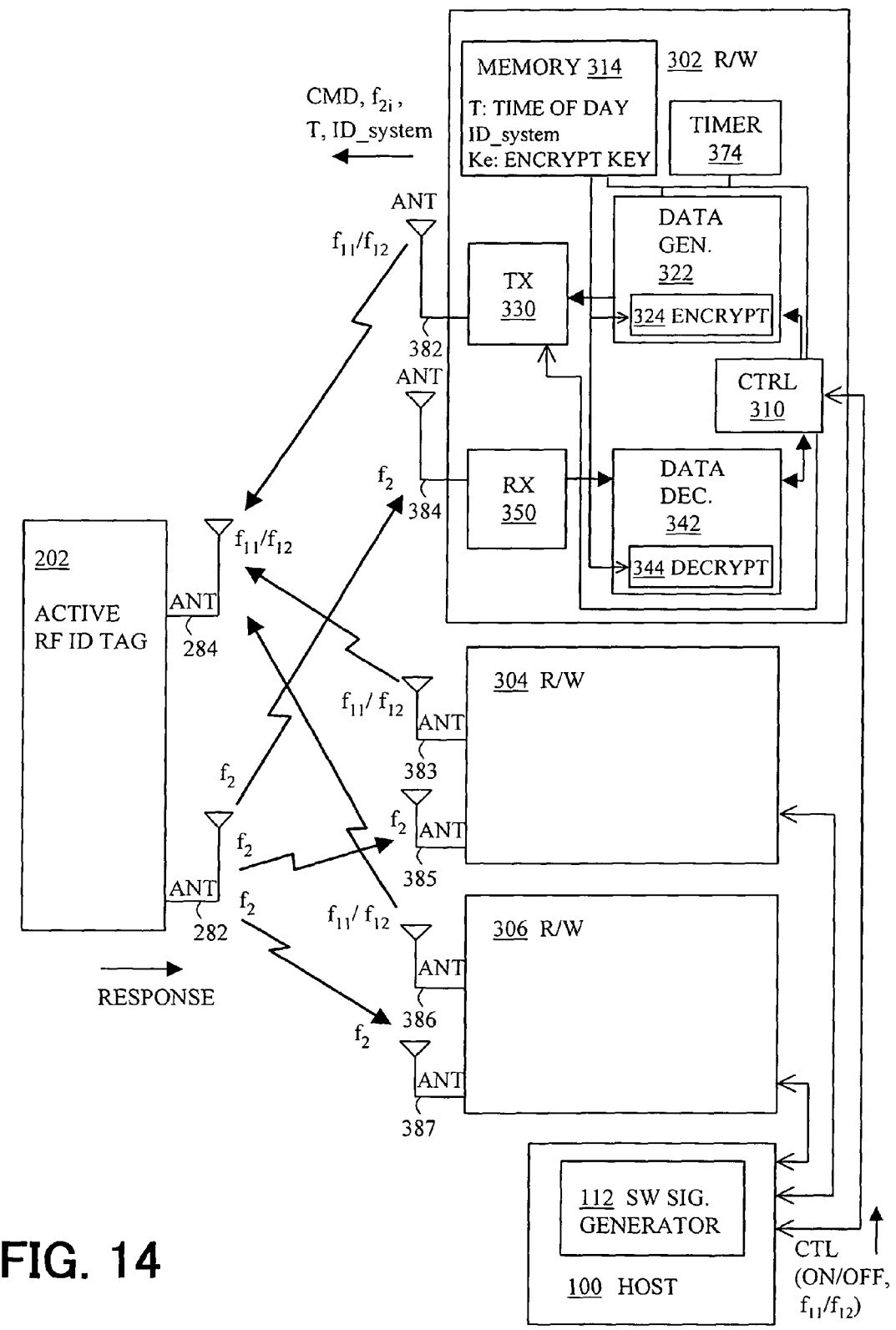
FIG. 14 shows reader/writer devices and an active RF ID tag in accordance with another embodiment of the invention.

FIG. 14 shows reader/writer devices 302, 304 and 306 and an active RF ID tag 202 in accordance with another embodiment of the invention. Each of the reader/writer devices 302, 304 and 306 transmits the respective RF signals carrying the tag ID request command at two different frequencies $f_{11}$ and $f_{12}$, such as 300.1 MHz and 300.3 MHz, in two respective periods of time among different periods of time t1, t2 and t3, and is always in a receive ready state for a response signal at a frequency $f_2$ or $f_{2i}$. The number of reader/writer devices is not limited to three, and may be four or more. The number of transmitting frequencies of each reader/writer device is not limited to two, and may be smaller than the number of reader/writer devices.

The RF ID tag 202 has the configuration as shown in FIG. 6. The RF ID tag 202 cyclically performs carrier sensing alternately at frequencies $f_{11}$ and $f_{12}$, to thereby receive the RF signal carrying a tag ID request command, and then transmits a response signal at a frequency $f_2$. The frequency switching unit 212 in the RF ID tag 202 of FIG. 6 cyclically switches the receiving frequency of the receiver unit 250, and thereby causes the receiver unit 250 to enter into a receive ready state for receiving the tag ID request signals at the receiving frequencies $f_{11}$ and $f_{12}$ in the time-division manner. The other configurations and operations of the reader/writer devices 302, 304 and 306 and the RF ID tag 202 are similar to those of FIG. 11.

Figures 15A, 15B, 15C:
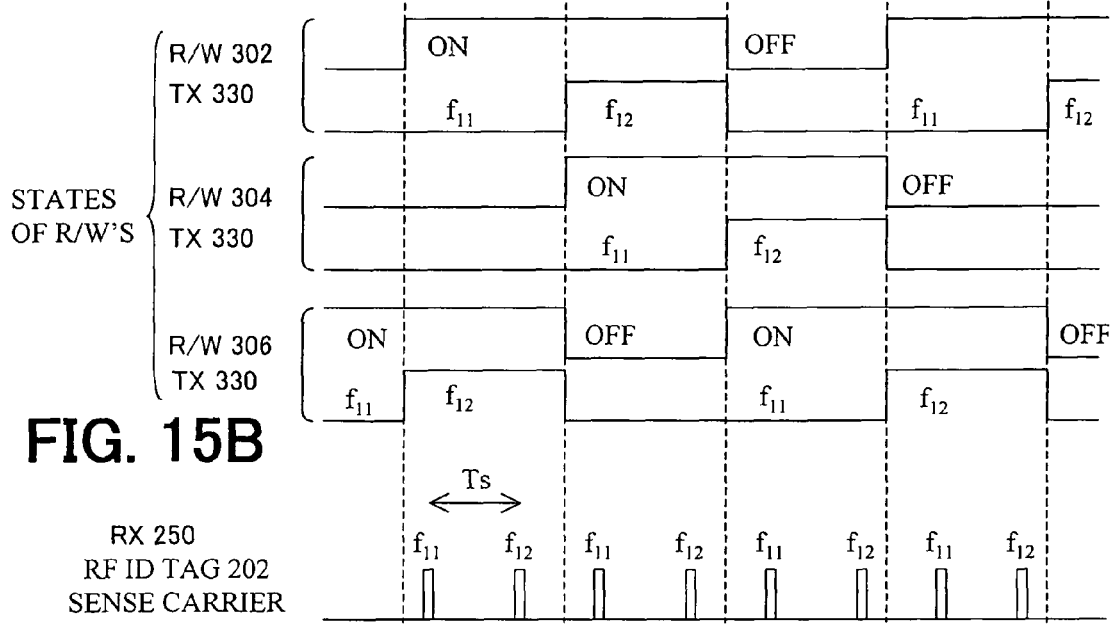
FIG. 15A shows a time chart of a control signal CTL provided from the host apparatus shown in FIG. 14 to the reader/writer devices.
FIG. 15B shows a time chart of the operation state of the transmitter unit of each of the reader/writer devices.
FIG. 15C shows a time chart of sensing a carrier in the active RF ID tag.

FIG. 15A shows a time chart of a control signal CTL provided from the host apparatus 100 shown in FIG. 14 to the reader/writer devices 302, 304 and 306. FIG. 15B shows a time chart of the operation state of the transmitter unit 330 of each of the reader/writer devices 302, 304 and 306. FIG. 15C shows a time chart of sensing a carrier in the active RF ID tag 202.

As shown in FIG. 15A, the host apparatus 100 provides, to each of the reader/writer devices 302, 304 and 306, a control signal CTL that includes a system ID or an identifier of each of the reader/writer devices 302, 304 and 306, an indication of ON/OFF, and values of the transmitting frequencies $f_{11}$ and $f_{12}$. In a first period of time t1 among cyclic periods of time t1, t2 and t3, each having a time length Tc such as one (1) second, the control signal CTL enables the transmitter unit 330 of each of the reader/writer devices 302 and 306, and then sets the transmitting frequencies $f_{11}$ and $f_{12}$ to the two respective transmitter units 330, while disabling the other reader/writer device 304. In the second period of time t2, the control signal CTL enables the transmitter unit 330 of each of the reader/writer devices 302 and 304, and then sets the transmitting frequencies $f_{12}$ and $f_{11}$ to the two respective transmitter units 330, while disabling the other reader/writer device 306. In the third period of time t3, the control signal CTL enables the transmitter unit 330 of each of the reader/writer devices 304 and 306, and then sets the transmitting frequencies $f_{12}$ and $f_{11}$ to the two respective transmitter units 330, while disabling the other reader/writer device 302.

The transmitter unit 330 of each of the reader/writer devices 302, 304 and 306 transmits, repeatedly at sufficiently short intervals, RF signals at the respective transmitting frequencies $f_{11}$ and $f_{12}$ each carrying the command, in the corresponding ones of periods of time t1, t2 and t3 shown in FIG. 15B. As shown in FIG. 15C, the receiver unit 250 of the RF ID tag 202 operates to sense carriers at the receiving frequencies $f_{11}$ and $f_{12}$ twice or more times in a cycle, for example of 0.48 seconds, during the time length Tc of each of the periods of time t1, t2 and t3. Thus the cycle Ts of carrier sensing is smaller than Tc/2. Thus, the receiver unit 250 of the RF ID tag 202 senses carriers at all of the different receiving frequencies in each period of time t1, t2 or t3 with the continuous transmission time length Tc in each of the reader/writer devices 302, 304 and 306. This improves the reliability of the carrier detection in the receiver unit 250 of the RF ID tag 202.

FIGS. 16A, 16C and 16E show a time chart of processing for transmission 42 of RF signals at two different frequencies $f_{11}$ and $f_{12}$ carrying ID request commands (CMD) in the reader/writer devices 302, 304 and 306 of FIG. 14. FIGS. 16B, 16D and 16F show a time chart of receive ready state 46 and of the processing for reception 48 of received RF signals at one frequency $f_2$ in the respective reader/writer devices 302, 304 and 306 of FIG. 14. FIG. 16G shows a time chart of carrier sensing 50 and 52, reception processing 54 of received RF signals, and transmission processing 56 for an RF signal carrying a response occurring subsequent to the successful authentication, in the RF ID tag 202 which is passing near the reader/writer devices 302, 304 and 306 of FIG. 14.

Referring to FIGS. 16A, 16C and 16E, similarly to FIG. 7A, the data generation unit 320 of each of the reader/writer devices 302, 304 and 306 is enabled cyclically in two corresponding ones of the periods of time t1, t2 and t3 set by the control signal CTL from the host apparatus 100. Then, the data generation unit 320 generates data containing a tag ID request command for the RF ID tag received from the control unit 310, then encodes the data in accordance with a predetermined encoding scheme, and thereby generates encoded encrypted data.

Referring to FIG. 16G, in the RF ID tag 202, the receiver unit 250 and the carrier determination unit 246 are enabled by the control unit 210 in the periods for carrier sensing 50 and 52 with a predetermined duration, for example of approximately 1-10 ms, occurring in a cycle Ts, for example of 0.48 seconds, in response to the wakeup signal from the wakeup unit 270. Thus, the receiver unit 250 goes into a receive ready state alternately at the receiving frequencies $f_{11}$ and $f_{12}$ so that the carrier determination unit 246 determines the presence or absence of a received carrier in accordance with the data received from the receiver unit 250 indicating the power intensity of the received RF signal carrier.

When the RF ID tag 202 enters into both of the communication ranges of the reader/writer devices 302 and 304 so that the receiver unit 250 of the RF ID tag 202 receives an RF signal at the frequency $f_{11}$ from the reader/writer device 302 in the period for carrier sensing 52 at the receiving frequency $f_{11}$ in the period of time t1 in FIG. 16G, the carrier determination unit 246 detects the carrier of the RF signal (DT), and hence determines the presence of a carrier. In the first half of the period of time t2 in FIG. 16G, the receiver unit 250 of the RF ID tag 202 receives an RF signal at the frequency $f_{12}$ from the reader/writer device 302 in the time period for carrier sensing 52 at the receiving frequency $f_{12}$, the carrier determination unit 246 detects the carrier of the RF signal (DT), and hence determines the presence of a carrier. In the second half of the period of time t2 in FIG. 16G, the receiver unit 250 of the RF ID tag 202 receives an RF signal at the frequency $f_{11}$, from the reader/writer device 304, in the time period for carrier sensing 52 at the receiving frequency $f_{11}$, the carrier determination unit 246 detects the carrier of the RF signal (DT), and hence determines the presence of a carrier.

When the RF ID tag 202 enters into both of the communication ranges of the reader/writer devices 304 and 306 so that the receiver unit 250 of the RF ID tag 202 receives an RF signal at the frequency $f_{12}$ from the reader/writer device 304 in the period for carrier sensing 52 at the receiving frequency $f_{12}$ in the first half of the period of time t3 in FIG. 16G, the carrier determination unit 246 detects the carrier of the RF signal (DT), and hence determines the presence of a carrier. In the second half of the period of time t3 in FIG. 16G, the receiver unit 250 of the RF ID tag 202 receives an RF signal at the frequency $f_{11}$ from the reader/writer device 306, in the time period for carrier sensing 52 at the receiving frequency $f_{11}$, the carrier determination unit 246 detects the carrier of the RF signal (DT), and hence determines the presence of a carrier.

In response to the resultant determination of the presence of a carrier at the frequency $f_{11}$ or $f_{12}$, the receiver unit 250 receives and demodulates the RF signal, and thereby generates encoded data containing a command. The data decoding unit 240 decrypts the encrypted data, then reproduces the command, and then provides the command to the control unit 210. In response to reception of the command, the control unit 210 authenticates the corresponding reader/writer device 302, 304 or 306.

Similarly to the operation in FIG. 7C, when the authentication has been successful, the control unit 210 enables, in response to the command, the data generation unit 220 and the transmitter unit 230 in a predetermined time period or slot of processing for transmission 56 selected at random within a predetermined period of time. Then, the enabled data generation unit 220 generates data containing the tag ID and other information, and then encodes the data in accordance with a predetermined encoding scheme. The enabled transmitter unit 230 modulates the carrier with the response data containing the tag ID, and then transmits an RF response signal at the transmitting frequency $f_2$.

Referring to FIGS. 16B, 16D and 16F, in the second half of the period of time t1 and in the period of time t2, similarly to the operation of FIG. 7B, the receiver unit 350 of each of the reader/writer devices 302 and 304 is always in a receive ready state 46, and receives an RF response signal at the frequency $f_2$ when the RF ID tag 202 approaches them. In the period of time t3, the receiver unit 350 of each of the reader/writer devices 304 and 306 is always in a receive ready state 46, and receives an RF response signal at the frequency $f_2$ when the RF ID tag 202 approaches them. When the receiver unit 350 of each reader/writer device receives an RF response signal at the frequency $f_2$, the receiver unit 350 thereof demodulates the received RF response signal, and thereby generates encoded encrypted data in the time period of processing for reception 48. The data decoding unit 342 then decodes the encoded encrypted data in accordance with a predetermined encoding scheme, then decrypts the decoded encrypted data to thereby reproduce the response data containing the tag ID, and then provides the reproduced response to the control unit 310. In response to the received and reproduced response, the control unit 310 authenticates the RF ID tag 202, and then provides the tag ID to the host apparatus 100.

The other operations of the reader/writer devices 302, 304 and 306, the RF ID tag 202, and the host apparatus 100 are similar to those of FIG. 11.

Since the reader/writer devices 302, 304 and 306 transmit RF signals at the plurality of different transmission frequencies $f_{11}$ and $f_{12}$ in the time-division manner as described above, the RF ID tag 202 senses and receives only a carrier of an RF signal at one transmission frequency $f_{11}$ or $f_{12}$ at one time. This significantly reduces the possible interference between transmitted RF signals from the reader/writer devices 302, 304 and 306. In addition, the cycle Ts of carrier sensing in the receiver unit 250 of the RF ID tag 202 is shorter than a quotient of the time length Tc of each of the continuous transmission in the reader/writer devices 302, 304 and 306 divided by the number of receiving frequencies. Thus, the RF ID tag 202 senses carriers at all of the different receiving frequencies in each one of the different periods of time t1, t2 and t3, each period having the continuous transmission time length Tc, for the reader/writer devices 302, 304 and 306. This further improves the probability of detection of the RF ID tag 202 in the reader/writer devices.

Figures 17A, 17B, 17C:
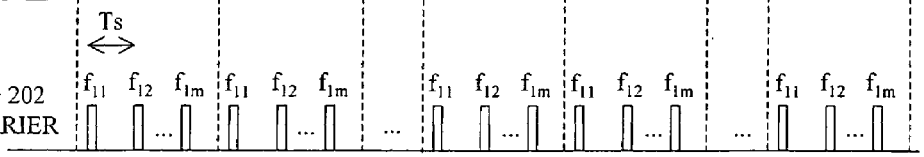
FIG. 17A shows a time chart of a control signal CTL provided from the host apparatus to a plurality of reader/writer devices.
FIG. 17B shows a time chart of the operation state of the transmitter unit of each of the reader/writer devices.
FIG. 17C shows a time chart of sensing a carrier in the active RF ID tag.

FIG. 17A shows a time chart of a control signal CTL provided from the host apparatus 100 to a plurality, q, of reader/writer devices R/W-1, R/W-2, ... R/W-q, where q is an integer equal to or greater than three. FIG. 17B shows a time chart of the operation state of the transmitter unit 330 of each of the reader/writer devices R/W-1 through R/W-q. FIG. 17C shows a time chart of sensing a carrier in the active RF ID tag 202.

As shown in FIG. 17A, the host apparatus 100 provides, to each of the reader/writer devices R/W-1 through R/W-q, a control signal CTL that includes a system ID or an identifier of each of the q reader/writer devices R/W-1 through R/W-q, an indication of ON/OFF, and m values of the transmission frequencies $f_{11}, f_{12}, \ldots f_{1m}$, where m is an integer that satisfies 1<m<q. In periods of time t1 through tm among q cyclic periods of time t1, t2, ... tq, each having a time length Tc such as one (1) second, the control signal CTL enables or turns ON the transmitter unit 330 of the reader/writer device R/W-1, and sets the respective transmitting frequencies $f_{11}, f_{12}, \ldots f_{1m}$ to it. In periods of time t2 through t(m+1) among the q periods of time t1, t2, t3, ... tq, the control signal CTL enables or turns ON the transmitter unit 330 of the reader/writer device R/W-2, and sets the respective transmitting frequencies $f_{11}, f_{12}, \ldots f_{1m}$ to it, ... and so on. In periods of time tq and t1 through t(m-1) among the q periods of time t1, t2, ... tq, the control signal CTL enables or turns ON the transmitter unit 330 of the reader/writer device R/W-q, and sets the respective transmitting frequencies $f_{11}, f_{12} \ldots f_{1m}$ to it.

The transmitter unit 330 of each of the reader/writer devices R/W-1 through R/W-q transmits, repeatedly at sufficiently short intervals, RF signals at the respective transmitting frequencies $f_{11}$, through $f_{1m}$ each carrying the command, in the corresponding ones of q periods of time t1 through tq shown in FIG. 17B. As shown in FIG. 17C, the receiver unit 250 of the RF ID tag 202 operates to cyclically sense carriers at the receiving frequencies $f_{11}$ through $f_{1m}$ which occurs at a higher rate than the occurrence of the number m of the receiving frequencies $f_{11}$ through $f_{1m}$ in each time length Tc of each of the periods of time t1 through tq. Thus the cycle Ts of carrier sensing is shorter than Tc/m (i.e., Ts<Tc/m). Thus, the receiver unit 250 of the RF ID tag 202 senses carriers at all of the different receiving frequencies $f_{11}$ through $f_{1m}$ in each one of the different periods of time t1 through tq, each period having a continuous transmission time length Tc, in the reader/writer devices 302, 304 and 306. This improves the reliability of carrier detection in the receiver unit 250 of the RF ID tag 202.

FIGS. 18A, 18B and 18C are modifications of the time charts of FIGS. 17A-17C. FIG. 18A shows a further time chart of a control signal CTL provided from the host apparatus 100 to a plurality, q, of reader/writer devices R/W-1, R/W-2, R/W-q. FIG. 18B shows a time chart of the operation state of the transmitter unit 330 of each of the reader/writer devices R/W-1 through R/W-q. FIG. 18C shows a time chart of sensing carriers in the active RF ID tag 202. The receiver unit 250 of the RF ID tag 202 may sense carriers at a plurality, k, of receiving frequencies at one time, and cyclically at a plurality, m, of receiving frequencies, where k is an integer satisfying k<m, and m is a multiple of k.

Referring to FIG. 18C, the receiver unit 250 of the RF ID tag 202 operates to perform carrier sensing cyclically and simultaneously at the plurality, k, of the receiving frequencies $(f_{11}$ through $f_{1k})$, $(f_{1\ k+1}$ through $f_{1\ 2k})$, ... $(f_{1\ m-k+1}$ through $f_{1m})$, $(f_{11}$ through $f_{1k})$ ..., which occurs at a higher rate than the occurrence of the number m of receiving frequencies $f_{11}$ through $f_{1m}$ in each time length Tc of each period of time t1 through tq. When the receiver unit 250 attempts to sense carriers of RF signals at the k respective receiving frequencies $f_{1\ pk+1}$ through $f_{1\ (p+1)k}$ ($0 \leq p \leq m/k-1$) among the m receiving frequencies in the time period for carrier sensing 52 and detects at least one carrier, the control unit causes the receiver unit 250 to receive simultaneously at least one RF signal carrying an ID request command at the at least one receiving frequency in the subsequent time period of processing for reception 54 and causes the transmitter unit 230 to transmit an RF response signal at the transmitting frequency $f_2$ in the time period of processing for transmission 56. The value of k may be three (k=3) for example. For example, during the time length Tc, it may perform carrier sensing simultaneously at the k receiving frequencies at m/k+1 different times (the total number of events of carrier sensing is k×(m/k+1)=m+k). Thus, the cycle Ts of carrier sensing is smaller than Tc×k/m (i.e., Ts<Tc·k/m). Thus, similarly to the operation of FIG. 17C, the receiver unit 250 of the RF ID tag 202 senses carriers at all of the different receiving frequencies $f_{11}$ through $f_{1m}$ in each one of the different periods of time t1 through tq, each period having a continuous transmission time length Tc, for the reader/writer devices R/W-1 through R/W-q.

FIG. 19A is a flow chart for changing the cycle Ts of carrier sensing in the receiver unit 250 depending on the remaining electric power P of the battery 290 of the active RF ID tag 202, which is executed by the control unit 210 of the active RF ID tag 202.

At Step 1702, the control unit 210 detects the value of a supply voltage Vd of the battery 290, determines the presently remaining electric power P of the battery 290 corresponding to the voltage value, and then stores information indicating the remaining electric power P into the memory 214. At Step 1704, the control unit 210 determines whether the remaining electric power P stored in the memory 214 is smaller than a threshold power Pth. If it is determined that the remaining electric power P is smaller than the threshold power Pth, then the control unit 210 at Step 1706 sets the cycle Ts of carrier sensing to have a longer value, such as 0.9 seconds. If it is determined that the remaining electric power P is not smaller than the threshold power Pth, the control unit 210 at Step 1708 sets the cycle Ts of carrier sensing to have a normal value, such as 0.45 seconds. After that, the procedure returns to Step 1702.

At Step 1706, the control unit 210 may set the cycle Ts of carrier sensing to have a variable value depending on the level of the remaining electric power P of the battery 290. FIG. 19B shows the cycle Ts of the carrier sensing in the receiver unit 250 relative to the remaining electric power P of the battery 290 of the active RF ID tag 202. When the remaining electric power P is equal to or larger than the threshold power Pth, the cycle Ts is set to have the normal value Ts=Tn. As the remaining electric power P decreases and has a smaller value than the threshold power Pth, the cycle Ts is set to have a larger value. Ultimately, the cycle is set to have a maximum value, which is slightly shorter than the continuous transmission time length Tc.

FIGS. 19C and 19D show a relation between the remaining electric power P of the battery 290 and the cycle Ts of the carrier sensing in the active RF ID tag 202. In FIGS. 19C and 19D, as the remaining electric power P of the battery 290 decreases gradually as a function of time t, the cycle Ts of the carrier sensing is set to be longer at a particular time.

By setting the cycle Ts of the carrier sensing to be longer at the particular time while the remaining electric power P of the battery 290 decreases gradually, the battery power consumption can be reduced in the RF ID tag 202 so that the battery run time in the RF ID tag 202 is effectively extended.

Although the invention has been described in connection with application to the RF ID tags, it should be understood by those skilled in the art that the invention is not limited to this application and is also applicable to contactless IC cards.

The above-described embodiments are only typical examples, and their combination, modifications and variations are apparent to those skilled in the art. It should be noted that those skilled in the art can make various modifications to the above-described embodiments without departing from the principle of the invention and the accompanying claims.

What is claimed is:

1. An information access system for accessing information in a contactless information storage device, comprising:
    an active-type contactless information storage device having a memory, a timer for measuring time, a first control unit, a first receiver unit for sensing a carrier of an RF signal at a first frequency for detection, and a first transmitter unit for transmitting a response signal at a second frequency different from the first frequency in response to reception of an information request signal;
    a first reader/writer device connected to an information processing apparatus, and having a second control unit, a second transmitter unit for cyclically transmitting an information request signal at the first frequency in a first transmission period and going into an inactive state in a second transmission period, under the control of the second control unit, and a second receiver unit adapted to be continuously ready to receive an RF signal at the second frequency; and
    a second reader/writer device connected to the information processing apparatus, and having a third control unit, a third transmitter unit for cyclically transmitting an information request signal at the first frequency in the second transmission period and going into an inactive state in the first transmission period, under the control of the third control unit, and a third receiver unit adapted to be continuously ready to receive an RF signal at the second frequency, wherein
    the first control unit
    controls, in carrier sensing periods occurring in a carrier sensing cycle, the first transmitter unit to be in an inactive state and the first receiver unit to be in an active state and sense a carrier of an RF signal at the first frequency, the carrier sensing cycle being shorter than each of the first and second transmission periods, the carrier sensing cycle being determined according to the timer,
    causes the first receiver unit to further receive the information request signal when the first receiver unit detects a carrier of an RF signal at the first frequency in any one of the carrier sensing periods, and further causes the first transmitter unit to transmit a response signal at the second frequency that carries a piece of information stored in the memory in response to the information request signal, and
    controls the active-type contactless information storage device to go into a sleep mode of operation during a non-carrier-sensing period between one of the carrier sensing periods and a subsequent one of the carrier sensing periods so that the first receiver unit and the first transmitter unit are in the inactive state, when the first receiver unit detects no carrier in the one carrier sensing period.

2. The information access system according to claim 1, further comprising a third reader/writer device connected to the information processing apparatus, and having a fourth control unit, a fourth transmitter unit for cyclically transmitting an information request signal at the first frequency in a third transmission period and going into an inactive state in the first and second transmission periods, under the control of the fourth control unit, and a fourth receiver unit adapted to be continuously ready to receive an RF signal at the second frequency, wherein
    the first transmitter unit of the first reader/writer device and the second transmitter unit of the second reader/writer device go into an inactive state in the third transmission period.

3. An information access system for accessing information in a contactless information storage device, comprising:
    an active-type contactless information storage device having a memory, a timer for measuring time, a first control unit, a first receiver unit for sensing carriers of RF signals at first and second different frequencies for detection, and a first transmitter unit for transmitting a response signal at a third frequency different from the first and second frequencies in response to reception of an information request signal; and
    at least three reader/writer devices, wherein
    a first reader/writer device of the at least three reader/writer devices is connected to an information processing apparatus, and has a second control unit, a second transmitter unit for going into an inactive state in a first transmission period, cyclically transmitting an information request signal at the first frequency in a second transmission period, and cyclically transmitting an information request signal at the second frequency in a third transmission period, under the control of the second control unit, and a second receiver unit adapted to be continuously ready to receive an RF signal at the third frequency, and
    a second reader/writer device of the at least three reader/writer devices is connected to the information processing apparatus, and has a third control unit, a third transmitter unit for going into an inactive state in the second transmission period, cyclically transmitting an information request signal at the first frequency in the third transmission period, and cyclically transmitting an information request signal at the second frequency in a period different from the second and third transmission periods, under the control of the third control unit, and a third receiver unit adapted to be continuously ready to receive an RF signal at the third frequency, wherein
    the first control unit controls, in a first series of carrier sensing periods occurring in a carrier sensing cycle, the first transmitter unit to be in an inactive state and the first receiver unit to be in an active state and sense a carrier of an RF signal at the first frequency, and controls, in a second series of carrier sensing periods occurring in the carrier sensing cycle, the first transmitter unit to be in the inactive state and the first receiver unit to be in the active state and sense a carrier of an RF signal at the second frequency, the carrier sensing cycle being shorter than each of the first and second transmission periods, each carrier sensing cycle being determined according to the timer, when the first receiver unit detects a carrier of an RF signal at the first or second frequency in any one carrier sensing period of the first or second series, the first control unit causes the first receiver unit to further receive the information request signal, and causes the first transmitter unit to transmit a response signal at the third frequency that carries a piece of information stored in the memory in response to the information request signal, and when the first receiver unit detects no carrier in one carrier sensing period of the first or second series, the first control unit controls the active-type contactless information storage device to go into a sleep mode of operation during a non-carrier-sensing period between the one carrier sensing period and a subsequent carrier sensing period of the second or first series so that the first receiver unit and the first transmitter unit are in the inactive state.

4. An information access system for accessing information in a contactless information storage device, comprising:

an active-type contactless information storage device having a memory, a timer for measuring time, a first control unit, a first receiver unit for sensing carriers of RF signals at a plurality, m, of different frequencies for detection, where m is an integer, and a first transmitter unit for transmitting a response signal at another frequency different from the m frequencies in response to reception of an information request signal; and a plurality, q, of reader/writer devices, where q is an integer larger than m and is equal to or larger than three, wherein each of the q reader/writer devices has a second transmitter unit for cyclically transmitting an information request signal at corresponding one of the m frequencies in each of m transmission periods of cyclic q transmission periods and going into an inactive state in the other transmission periods of the cyclic q transmission periods, and a second receiver unit adapted to be continuously ready to receive an RF signal at the third frequency, wherein in ones of the cyclic q transmission periods, m reader/writer devices of the q reader/writer devices cyclically transmit respective information request signals at respective different frequencies, during one of the cyclic q transmission periods, the first control unit controls, in carrier sensing periods occurring in a cycle, the first transmitter unit to be in an inactive state and the first receiver unit to be in an active state and sense sequentially carriers of RF signals at the m frequencies, the cycle being shorter than the length of the one transmission period divided by m, the carrier sensing cycle being determined according to the timer, and when the first receiver unit detects a carrier of an RF signal at one of the m frequencies in a any one of the carrier sensing periods, the first control unit causes the first receiver unit to further receive the information request signal, and causes, in response to the information request signal, the first transmitter unit to transmit a response signal at the other frequency carrying a piece of information stored in the memory, and when the first receiver unit detects no carrier in one of the carrier sensing periods, the first control unit controls the active-type contactless information storage device to go into a sleep mode of operation during a non-carrier-sensing period between the one carrier sensing period and a subsequent one of the carrier sensing periods so that the first receiver unit and the first transmitter unit are in the inactive state.

5. An active-type contactless information storage device comprising:

a memory;

a timer for measuring time;

a receiver unit for operating to sense a carrier of an information request signal at one of m different frequencies for detection, from one of a plurality, q, of reader/writer devices, in one of q transmission periods, when the active contactless information storage device is located in a communication range of one or more of the plurality of reader/writer devices;

a transmitter unit for modulating a carrier with data and transmitting a response signal at a further frequency different from the m frequencies to the one reader/writer device; and a control unit for controlling the receiver unit and the transmitter unit, wherein the control unit controls, in carrier sensing periods occurring in a carrier sensing cycle, the transmitter unit to be in an inactive state and the receiver unit to be in an active state and sense carriers of RF signals at the m frequencies, the carrier sensing cycle being shorter than each of the q transmission periods, the carrier sensing cycle being determined according to the timer, when the receiver unit detects a carrier of an RF signal at one of the m frequencies in any one of the carrier sensing periods, the control unit causes the receiver unit to further receive the information request signal, and causes, in response to the information request signal, the transmitter unit to transmit a response signal at the further frequency carrying a piece of information stored in the memory, when the receiver unit detects no carrier in one of the carrier sensing periods, the control unit controls the active-type contactless information storage device to go into a sleep mode of operation during a non-carrier-sensing period between the one carrier sensing period and a subsequent one of the carrier sensing periods so that the receiver unit and the transmitter unit are in the inactive state, the control unit detects a remaining electric power of the active-type contactless information storage device, and when the detected remaining electric power is lower than a threshold, the control unit extends the carrier sensing cycle into a longer length which is shorter than the one transmission period.

6. The information storage device according to claim 5, wherein the control unit sets the cycle varying in a relation with the length of the one transmission period depending on the detected remaining electric power.

7. The information storage device according to claim 5, wherein the receiver unit senses simultaneously carriers of information request signals at one or more of the m different frequencies for detection.

8. The information storage device according to claim 5, wherein, when the receiver unit detects carriers of RF signals at one or more of the m frequencies in any one of the carrier sensing periods, the control unit causes the receiver unit to further receive simultaneously the information request signals at the one or more frequencies.

9. In an information access system, a method for accessing information in a contactless information storage device, the information access system comprising:

an active-type contactless information storage device having a memory, a timer for measuring time, a first control unit, a first receiver unit and a first transmitter unit;
a first reader/writer device connected to an information processing apparatus, and having a second control unit, a second transmitter unit and a second receiver unit; and
a second reader/writer device connected to the information processing apparatus, and having a third control unit, a third transmitter unit and a third receiver unit, the method comprising:
under the control of the second control unit, controlling the second transmitter unit of the first reader/writer device to cyclically transmit an information request signal at a first frequency in a first transmission period and to go into an inactive state in a second transmission period, and controlling the second receiver unit to be continuously ready to receive an RF signal at a second frequency,
under the control of the third control unit, controlling the third transmitter unit of the second reader/writer device to cyclically transmit an information request signal at the first frequency in the second transmission period and to go into an inactive state in the first transmission period, and controlling the third receiver unit to be continuously ready to receive an RF signal at the second frequency,
under the control of the first control unit, controlling, in carrier sensing periods occurring in a carrier sensing cycle, the first transmitter unit to be in an inactive state and the first receiver unit to be in an active state and sense a carrier of an RF signal at the first frequency, the carrier sensing cycle being shorter than each of the first and second transmission periods, the carrier sensing cycle being determined according to the timer,
when the first receiver unit detects a carrier of an RF signal at the first frequency in any one of the carrier sensing periods, causing the first receiver unit to further receive the information request signal, and causing, in response to the information request signal, the first transmitter unit to transmit a response signal at the second frequency that carries a piece of information stored in the memory,
when the first receiver unit detects no carrier in one of the carrier sensing periods, controlling the active-type contactless information storage device to go into a sleep mode of operation during a non-carrier-sensing period between the one carrier sensing period and a subsequent one of the carrier sensing periods so that the first receiver unit and the first transmitter unit are in the inactive state.

10. The method for accessing information in a contactless information storage device according to claim 9, the information access system further comprising a third reader/writer device connected to the information processing apparatus, and having a fourth control unit, a fourth transmitter unit and a fourth receiver unit, the method further comprising:
under the control of the fourth control unit, controlling the fourth transmitter unit of the third reader/writer device to cyclically transmit an information request signal at the first frequency in a third transmission period and to go into an inactive state in the first and second transmission periods, and controlling the fourth receiver unit to be continuously ready to receive an RF signal at the second frequency,
under the control of the second control unit, controlling the first transmitter unit of the first reader/writer device to go into an inactive state in the third transmission period, and under the control of the third control unit, controlling the second transmitter unit of the second reader/writer device to go into an inactive state in the third transmission period.

11. In an information access system, a method for accessing information in a contactless information storage device, the information access system comprising:
an active-type contactless information storage device having a memory, a timer for measuring time, a first control unit, a first receiver unit and a first transmitter unit, and
at least three reader/writer devices, wherein
a first reader/writer device of the at least three reader/writer devices is connected to an information processing apparatus, and has a second control unit, a second transmitter unit and a second receiver unit, and
a second reader/writer device of the at least three reader/writer devices is connected to the information processing apparatus, and has a third control unit, a third transmitter unit and a third receiver unit, the method comprising:
controlling, under the control of the second control unit, the second transmitter of the first reader/writer device to go into an inactive state in a first transmission period, to cyclically transmit an information request signal at a first frequency in a second transmission period, and controlling the second receiver unit to be continuously ready to receive an RF signal at a third frequency different from the first frequency,
controlling, under the control of the third control unit, the third transmitter of the second reader/writer device to go into an inactive state in the second transmission period, to cyclically transmit an information request signal at a second frequency in a third transmission period, and controlling the third receiver unit to be continuously ready to receive an RF signal at the third frequency, the third frequency also different from the second frequency,
under the control of the first control unit, controlling, in a first series of carrier sensing periods occurring in a carrier sensing cycle, the first transmitter unit to be in an inactive state and the first receiver unit to be in an active state and sense a carrier of an RF signal at the first frequency, and controlling, in a second series of carrier sensing periods occurring in the carrier sensing cycle, the first transmitter unit to be in the inactive state and the first receiver unit to be in the active state and sense a carrier of an RF signal at the second frequency, the carrier sensing cycle being shorter than each of the first and second transmission periods, each carrier sensing cycle being determined according to the timer,
when the first receiver unit detects a carrier of an RF signal at the first or second frequency in any one carrier sensing period of the first or second series, under the control of the first control unit, causing the first receiver unit to further receive the information request signal, and causing the first transmitter unit to transmit a response signal at the third frequency that carries a piece of information stored in the memory in response to the information request signal,
when the first receiver unit detects no carrier in one carrier sensing period of the first or second series, controlling the active-type contactless information storage device to go into a sleep mode of operation during a non-carrier-sensing period between the one carrier sensing period and a subsequent carrier sensing period of the second or first series so that the first receiver unit and the first transmitter unit are in the inactive state.

12. In an information access system, a method for accessing information in a contactless information storage device, the information access system comprising:

a first reader/writer device connected to an information processing apparatus, and having a first control unit, a first transmitter unit and a first receiver unit, and a second reader/writer device connected to the information processing apparatus, and having a second control unit, a second transmitter unit and a second receiver unit, the method comprising:

allowing the contactless information storage device to sense a carrier of an RF signal from the first reader/writer device and the second reader/writer device in a carrier sensing cycle and go into a sleep mode of operation in a sleep period of time after the sensing, under the control of the first control unit, controlling the first transmitter unit of the first reader/writer device to cyclically transmit an information request signal at a first frequency in a first transmission period longer than the cycle and to go into an inactive state in a second transmission period longer than the cycle, and controlling the first receiver unit to be continuously ready to receive an RF signal at a third frequency in the first and second transmission periods, and under the control of the second control unit, controlling the second transmitter unit of the second reader/writer device to cyclically transmit an information request signal at a second frequency in the second transmission period and to go into an inactive state in the first transmission period, and controlling the second receiver unit to be continuously ready to receive an RF signal at the third frequency.

13. The method for accessing information in a contactless information storage device according to claim 12, wherein the first frequency is the same as the second frequency.

14. The method for accessing information in a contactless information storage device according to claim 12, the information access system further comprising a third reader/writer device connected to the information processing apparatus, and having a third control unit, a third transmitter unit and a third receiver unit, the method further comprising:

under the control of the third control unit, controlling the third transmitter unit of the third reader/writer device to cyclically transmit an information request signal at a fourth frequency in a third transmission period and to go into an inactive state in the first and second transmission periods, and controlling the third receiver unit to be continuously ready to receive an RF signal at the third frequency in the first, second and third transmission periods.

15. A non-transitory storage medium storing a program thereon for accessing information in a contactless information storage device, the program being for use in an information access system comprising:

an active-type contactless information storage device having a memory, a timer for measuring time, a first control unit, a first receiver unit and a first transmitter unit;

a first reader/writer device connected to an information processing apparatus, and having a second control unit, a second transmitter unit and a second receiver unit; and a second reader/writer device connected to the information processing apparatus, and having a third control unit, a third transmitter unit and a third receiver unit, the method comprising:

under the control of the second control unit, controlling the second transmitter unit of the first reader/writer device to cyclically transmit an information request signal at a first frequency in a first transmission period and to go into an inactive state in a second transmission period, and controlling the second receiver unit to be continuously ready to receive an RF signal at a second frequency, under the control of the third control unit, controlling the third transmitter unit of the second reader/writer device to cyclically transmit an information request signal at the first frequency in the second transmission period and to go into an inactive state in the first transmission period, and controlling the third receiver unit to be continuously ready to receive an RF signal at the second frequency, under the control of the first control unit, controlling, in carrier sensing periods occurring in a carrier sensing cycle, the first transmitter unit to be in an inactive state and the first receiver unit to be in an active state and sense a carrier of an RF signal at the first frequency, the carrier sensing cycle being shorter than each of the first and second transmission periods, the carrier sensing cycle being determined according to the timer, when the first receiver unit detects a carrier of an RF signal at the first frequency in any one of the carrier sensing periods, causing the first receiver unit to further receive the information request signal, and causing, in response to the information request signal, the first transmitter unit to transmit a response signal at the second frequency that carries a piece of information stored in the memory, when the first receiver unit detects no carrier in one of the carrier sensing periods, controlling the active-type contactless information storage device to go into a sleep mode of operation during a non-carrier-sensing period between the one carrier sensing period and a subsequent one of the carrier sensing periods so that the first receiver unit and the first transmitter unit are in the inactive state.

16. The non-transitory storage medium according to claim 15, wherein the information access system further comprises a third reader/writer device connected to the information processing apparatus, and having a fourth control unit, a fourth transmitter unit and a fourth receiver unit, the program being operable to further effect:

under the control of the fourth control unit, controlling the fourth transmitter unit of the third reader/writer device to cyclically transmit an information request signal at the first frequency in a third transmission period and to go into an inactive state in the first and second transmission periods, and controlling the fourth receiver unit to be continuously ready to receive an RF signal at the second frequency, under the control of the second control unit, controlling the first transmitter unit of the first reader/writer device to go into an inactive state in the third transmission period, and under the control of the third control unit, controlling the second transmitter unit of the second reader/writer device to go into an inactive state in the third transmission period.

17. A non-transitory storage medium storing a program thereon for accessing information in a contactless information storage device, the program being for use in an information access system comprising:

an active-type contactless information storage device having a memory, a timer for measuring time, a first control unit, a first receiver unit and a first transmitter unit, and at least three reader/writer devices, wherein a first reader/writer device of the at least three reader/writer devices is connected to an information processing apparatus, and has a second control unit, a second transmitter unit and a second receiver unit, and a second reader/writer device of the at least three reader/writer devices is connected to the information processing apparatus, and has a third control unit, a third transmitter unit and a third receiver unit, the method comprising:

controlling, under the control of the second control unit, the second transmitter of the first reader/writer device to go into an inactive state in a first transmission period, to cyclically transmit an information request signal at a first frequency in a second transmission period, and controlling the second receiver unit to be continuously ready to receive an RF signal at a third frequency different from the first frequency, controlling, under the control of the third control unit, the third transmitter of the second reader/writer device to go into an inactive state in the second transmission period, to cyclically transmit an information request signal at a second frequency in a third transmission period, and controlling the third receiver unit to be continuously ready to receive an RF signal at the third frequency, the third frequency also different from the second frequency, under the control of the first control unit, controlling, in a first series of carrier sensing periods occurring in a carrier sensing cycle, the first transmitter unit to be in an inactive state and the first receiver unit to be in an active state and sense a carrier of an RF signal at the first frequency, and controlling, in a second series of carrier sensing periods occurring in the carrier sensing cycle, the first transmitter unit to be in the inactive state and the first receiver unit to be in the active state and sense a carrier of an RF signal at the second frequency, the carrier sensing cycle being shorter than each of the first and second transmission periods, each carrier sensing cycle being determined according to the timer, when the first receiver unit detects a carrier of an RF signal at the first or second frequency in any one carrier sensing period of the first or second series, under the control of the first control unit, causing the first receiver unit to further receive the information request signal, and causing the first transmitter unit to transmit a response signal at the third frequency that carries a piece of information stored in the memory in response to the information request signal, when the first receiver unit detects no carrier in one carrier sensing period of the first or second series, controlling the active-type contactless information storage device to go into a sleep mode of operation during a non-carrier-sensing period between the one carrier sensing period and a subsequent carrier sensing period of the second or first series so that the first receiver unit and the first transmitter unit are in the inactive state.

18. A non-transitory storage medium storing a program thereon for accessing information in a contactless information storage device, the program being for use in an information access system comprising:

a first reader/writer device connected to an information processing apparatus, and having a first control unit, a first transmitter unit and a first receiver unit, and a second reader/writer device connected to the information processing apparatus, and having a second control unit, a second transmitter unit and a second receiver unit, the method comprising:

allowing the contactless information storage device to sense a carrier of an RF signal from the first reader/writer device and the second reader/writer device in a carrier sensing cycle and go into a sleep mode of operation in a sleep period of time after the sensing, under the control of the first control unit, controlling the first transmitter unit of the first reader/writer device to cyclically transmit an information request signal at a first frequency in a first transmission period longer than the cycle and to go into an inactive state in a second transmission period longer than the cycle, and controlling the first receiver unit to be continuously ready to receive an RF signal at a third frequency in the first and second transmission periods, and under the control of the second control unit, controlling the second transmitter unit of the second reader/writer device to cyclically transmit an information request signal at a second frequency in the second transmission period and to go into an inactive state in the first transmission period, and controlling the second receiver unit to be continuously ready to receive an RF signal at the third frequency.

19. The non-transitory storage medium according to claim 18, wherein the first frequency is the same as the second frequency.

20. The non-transitory storage medium according to claim 18, wherein the information access system further comprising a third reader/writer device connected to the information processing apparatus, and having a third control unit, a third transmitter unit and a third receiver unit, the program being operable to further effect:

under the control of the third control unit, controlling the third transmitter unit of the third reader/writer device to cyclically transmit an information request signal at a fourth frequency in a third transmission period and to go into an inactive state in the first and second transmission periods, and controlling the third receiver unit to be continuously ready to receive an RF signal at the third frequency in the first, second and third transmission periods.

* * * * *